United States Patent
Wu et al.

(10) Patent No.: US 12,529,202 B2
(45) Date of Patent: Jan. 20, 2026

(54) WORK VEHICLE WITH IMPLEMENT SELF-LEVELING FUNCTIONALITY INCLUDING ROLLBACK PREVENTION AND RELATED SYSTEMS AND METHODS

(71) Applicant: CNH Industrial America LLC, New Holland, PA (US)

(72) Inventors: Duqiang Wu, Bolingbrook, IL (US); Joshua D. Zimmerman, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 214 days.

(21) Appl. No.: 18/489,973

(22) Filed: Oct. 19, 2023

(65) Prior Publication Data
US 2025/0129565 A1   Apr. 24, 2025

(51) Int. Cl.
*E02F 3/43* (2006.01)
*E02F 9/22* (2006.01)

(52) U.S. Cl.
CPC .............. *E02F 3/433* (2013.01); *E02F 3/436* (2013.01); *E02F 9/2203* (2013.01)

(58) Field of Classification Search
CPC .......... E02F 3/433; E02F 3/436; E02F 9/2203
See application file for complete search history.

(56) References Cited

U.S. PATENT DOCUMENTS

| | | | |
|---|---|---|---|
| 4,811,561 A | 3/1989 | Edwards et al. | |
| 4,844,685 A | 7/1989 | Sagaser | |
| 4,863,337 A | 9/1989 | Ishiguro et al. | |
| 4,964,779 A | 10/1990 | Sagaser | |
| 5,052,883 A | 10/1991 | Morita et al. | |
| 5,467,541 A | 11/1995 | Greer et al. | |

(Continued)

FOREIGN PATENT DOCUMENTS

| CN | 1703559 A | 11/2005 |
|---|---|---|
| CN | 101802417 A | 8/2010 |

(Continued)

OTHER PUBLICATIONS

Latorre-Biel et al., Front End Loader with Automatic Levelling for Farm Tractors, Research Paper, Department of Mechanical, Energy, and Materials Engineering, Public University of Navarre, Campus of Tudela, Spain. Published Jun. 11, 2016, 16 pages.

*Primary Examiner* — Kenneth M Dunne
(74) *Attorney, Agent, or Firm* — Dority & Manning, P.A.

(57) ABSTRACT

A method for automatically adjusting the position of an implement of a lift assembly of a work vehicle includes receiving an input associated with raising a boom of the lift assembly relative to the ground, monitoring an implement angle relative to a target implement angle as the boom is being raised, and identifying an implement angle error relative to the target implement angle as the boom is moved following the target implement angle initially being reached. In addition, the method includes selecting a closed-loop control algorithm to control movement of the implement based at least in part on a sign of the implement angle error, wherein the closed-loop control algorithm corresponds to a closed-loop position control algorithm when the implement angle error is a positive implement angle error and a closed-loop velocity control algorithm when the implement angle error is a negative implement angle error.

20 Claims, 8 Drawing Sheets

(56) References Cited

U.S. PATENT DOCUMENTS

| | | |
|---|---|---|
| 5,501,570 A | 3/1996 | Mozingo |
| 6,061,617 A | 5/2000 | Berger et al. |
| 6,233,511 B1 | 5/2001 | Berger et al. |
| 6,371,214 B1 | 4/2002 | Anwar et al. |
| 6,374,147 B1 | 4/2002 | Rockwood |
| 6,778,097 B1 | 8/2004 | Kajita et al. |
| 7,140,830 B2 | 11/2006 | Berger et al. |
| 7,530,185 B2 | 5/2009 | Trifunovic |
| 7,712,309 B2 | 5/2010 | Vigholm |
| 7,874,151 B2 | 1/2011 | Lin et al. |
| 7,881,845 B2 | 2/2011 | Nichols |
| 8,155,844 B2 | 4/2012 | Peters |
| 8,244,438 B2 | 8/2012 | Koch et al. |
| 8,340,875 B1 | 12/2012 | Shatters et al. |
| 8,392,075 B2 | 3/2013 | Mindeman et al. |
| 8,463,508 B2 | 6/2013 | Nicholson et al. |
| 8,500,387 B2 | 8/2013 | Trifunovic |
| 8,527,158 B2 | 9/2013 | Faivre et al. |
| 8,560,181 B2 | 10/2013 | Ekvall et al. |
| 8,843,282 B2 | 9/2014 | Atkinson |
| 8,845,265 B2 | 9/2014 | Oyama et al. |
| 8,886,415 B2 | 11/2014 | Shatters et al. |
| 8,974,171 B2 | 3/2015 | Shirao et al. |
| 9,238,899 B2 | 1/2016 | Matsumoto et al. |
| 9,464,410 B2 | 10/2016 | Johnson et al. |
| 9,567,724 B2 | 2/2017 | Wagner |
| 9,580,883 B2 | 2/2017 | Singh et al. |
| 9,796,571 B2 | 10/2017 | Singh et al. |
| 9,822,507 B2 | 11/2017 | Singh et al. |
| 9,956,966 B2 | 5/2018 | Versteyhe et al. |
| 10,017,912 B2 | 7/2018 | Singh et al. |
| 10,030,354 B1 | 7/2018 | Dean |
| 10,125,798 B2 | 11/2018 | Vigholm et al. |
| 10,385,541 B2 | 8/2019 | Dean |
| 10,981,763 B2 | 4/2021 | Myers et al. |
| 11,549,236 B1 | 1/2023 | Wu et al. |
| 2005/0073140 A1 | 4/2005 | Boucher |
| 2005/0102866 A1 | 5/2005 | Sewell et al. |
| 2008/0162000 A1 | 7/2008 | Dattilo et al. |
| 2011/0150614 A1 | 6/2011 | Nicholson et al. |
| 2011/0153171 A1 | 6/2011 | Krause et al. |
| 2012/0057956 A1* | 3/2012 | Shirao .............. E02F 3/433 414/707 |
| 2012/0101693 A1 | 4/2012 | Taylor |
| 2012/0263566 A1 | 10/2012 | Taylor et al. |
| 2013/0004282 A1 | 1/2013 | Grimes et al. |
| 2013/0046447 A1 | 2/2013 | Park |
| 2013/0085645 A1 | 4/2013 | Hayashi et al. |
| 2013/0108403 A1 | 5/2013 | Atkinson |
| 2016/0108602 A1 | 4/2016 | Singh et al. |
| 2016/0153165 A1 | 6/2016 | Singh et al. |
| 2017/0036899 A1 | 2/2017 | Singh et al. |
| 2023/0106480 A1 | 4/2023 | Wu et al. |

FOREIGN PATENT DOCUMENTS

| | | |
|---|---|---|
| CN | 102695885 A | 9/2012 |
| CN | 103148063 A | 6/2013 |
| CN | 103748366 A | 4/2014 |
| EP | 0810331 A1 | 12/1997 |
| EP | 0905325 A1 | 3/1999 |
| EP | 2535464 A2 | 12/2012 |
| WO | WO0169089 A2 | 9/2001 |
| WO | WO2012/065157 A1 | 5/2012 |
| WO | WO2013/057758 A1 | 4/2013 |

\* cited by examiner

WORK VEHICLE WITH IMPLEMENT SELF-LEVELING FUNCTIONALITY INCLUDING ROLLBACK PREVENTION AND RELATED SYSTEMS AND METHODS

FIELD OF THE INVENTION

The present subject matter relates generally to work vehicles and, more particularly, to systems and methods for automatically adjusting the orientation or angular position of an implement of a work vehicle so as to provide self-leveling functionality with rollback prevention as the vehicle's boom or loader arms are being moved.

BACKGROUND OF THE INVENTION

Work vehicles having lift assemblies, such as skid steer loaders, telescopic handlers, wheel loaders, backhoe loaders, forklifts, compact track loaders and the like, are a mainstay of construction work and industry. For example, skid steer loaders typically include a lift assembly having a pair of loader arms pivotally coupled to the vehicle's chassis that can be raised and lowered at the operator's command. In addition, the lift assembly includes an implement attached to the ends of the loader arms, thereby allowing the implement to be moved relative to the ground as the loader arms are raised and lowered. For example, a bucket is often coupled to the loader arms, which allows the skid steer loader to be used to carry supplies or particulate matter, such as gravel, sand, or dirt, around a worksite.

When using a work vehicle to perform a material moving operation or any other suitable operation, it is often desirable to maintain the vehicle's bucket or other implement at a constant angular position relative to the vehicle's driving surface (or relative to any other suitable reference point or location) as the loader arms are being raised and/or lowered. To achieve such control, conventional work vehicles typically rely on the operator manually adjusting the position of the implement as the loader arms are being moved. Unfortunately, this task is often quite challenging for the operator and can lead to materials being inadvertently dumped from the implement. To solve this problem, control systems have been disclosed that attempt to provide a control algorithm for automatically maintaining a constant angular implement position as the vehicle's loader arms are being moved. However, such previously disclosed automatic control systems still suffer from many drawbacks, including poor system responsiveness and imprecise implement position control. In particular, previously disclosed control systems have been unable to properly accommodate the non-linearity of the operational dynamics of the lift assembly as the loader arms are being moved, thereby providing less than desirable results. This particularly true at the upper end of the movement range for the loader arms, as the implement control is typically more sensitive at such loader arm position due to the non-linear kinematics.

Accordingly, an improved system and method for automatically adjusting the position of an implement of a work vehicle so as to maintain the implement at a desired angular orientation relative to a given reference point would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for automatically adjusting the position of an implement of a lift assembly of a work vehicle, the lift assembly comprising a boom coupled to the implement. The method includes receiving, with a computing system, an input associated with raising the boom relative to the ground, with the implement being initially oriented at an implement angle that differ from a target implement angle. The method also includes monitoring, with the computing system, the implement angle relative to the target implement angle as the boom is being raised, determining, with the computing system, that the implement angle has initially reached the target implement angle, identifying, with the computing system, an implement angle error relative to the target implement angle as the boom is moved following the target implement angle initially being reached. In addition, the method includes selecting, with the computing system, a closed-loop control algorithm to control movement of the implement based at least in part on a sign of the implement angle error, wherein the closed-loop control algorithm corresponds to a closed-loop position control algorithm when the implement angle error is a positive implement angle error and a closed-loop velocity control algorithm when the implement angle error is a negative implement angle error. Moreover, the method includes generating, with the computing system, a closed-loop valve command signal using the closed-loop control algorithm, and controlling, with computing system, an operation of at least one valve associated with the implement based at least in part on the closed-loop valve command signal to adjust the implement angle back towards the target implement angle.

In another aspect, the present subject matter is directed to a method for automatically adjusting the position of an implement of a lift assembly of a work vehicle, the lift assembly comprising a boom coupled to the implement. The method includes receiving, with a computing system, an input associated with raising the boom relative to the ground, with the implement being initially oriented at an implement angle that differs from a target implement angle. The method also includes monitoring, with the computing system, the implement angle relative to the target implement angle as the boom is being raised, determining, with the computing system, that the implement angle has initially reached the target implement angle, and identifying, with the computing system, an implement angle error relative to the target implement angle as the boom is moved following the target implement angle initially being reached. In addition, the method includes executing, with the computing system, closed-loop position control to control movement of the implement when the implement angle error is a positive implement angle error, wherein execution of the closed-loop position control comprises generating, with the computing system, a first closed-loop valve command signal based at least in part on the positive implement angle error, and controlling, with computing system, an operation of at least one valve associated with the implement based at least in part on the first closed-loop valve command signal to adjust the implement angle back towards the target implement angle. Moreover, the method includes executing, with the computing system, closed-loop velocity control to control movement of the implement when the implement angle error is a negative implement angle error, wherein execution of the closed-loop velocity control comprises generating, with the computing system, a second closed-loop valve command signal based at least in part on a velocity error associated with the implement, and controlling, with computing system, the operation of the at least one valve based at least in part on the second closed-loop valve command signal to adjust the implement angle back towards the target implement angle.

In a further aspect, the present subject matter is directed to a system for controlling the operation of a work vehicle. The system includes a lift assembly including a boom and an implement coupled to the boom. The system also includes at least one tilt valve in fluid communication with a corresponding tilt cylinder, with the tilt valve(s) being configured to control a supply of hydraulic fluid to the tilt cylinder to adjust a position of the implement relative to the boom. Additionally, the system includes a computing system communicatively coupled to the tilt valve(s). The computing system is configured to receive an input associated with raising the boom relative to the ground, with the implement being initially oriented at an implement angle that differs from a target implement angle. The computing system is also configured to monitor the implement angle relative to the target implement angle as the boom is being raised, determine that the implement angle has initially reached the target implement angle, and identify an implement angle error relative to the target implement angle as the boom is moved following the target implement angle initially being reached. In addition, the computing system is configured to select a closed-loop control algorithm to control movement of the implement based at least in part on a sign of the implement angle error, wherein the closed-loop control algorithm corresponds to a closed-loop position control algorithm when the implement angle error is a positive implement angle error and a closed-loop velocity control algorithm when the implement angle error is a negative implement angle error. Moreover, the computing system is configured to generate a closed-loop valve command signal using the closed-loop control algorithm, and control an operation of the at least one tilt valve based at least in part on the closed-loop valve command signal to adjust the implement angle back towards the target implement angle.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
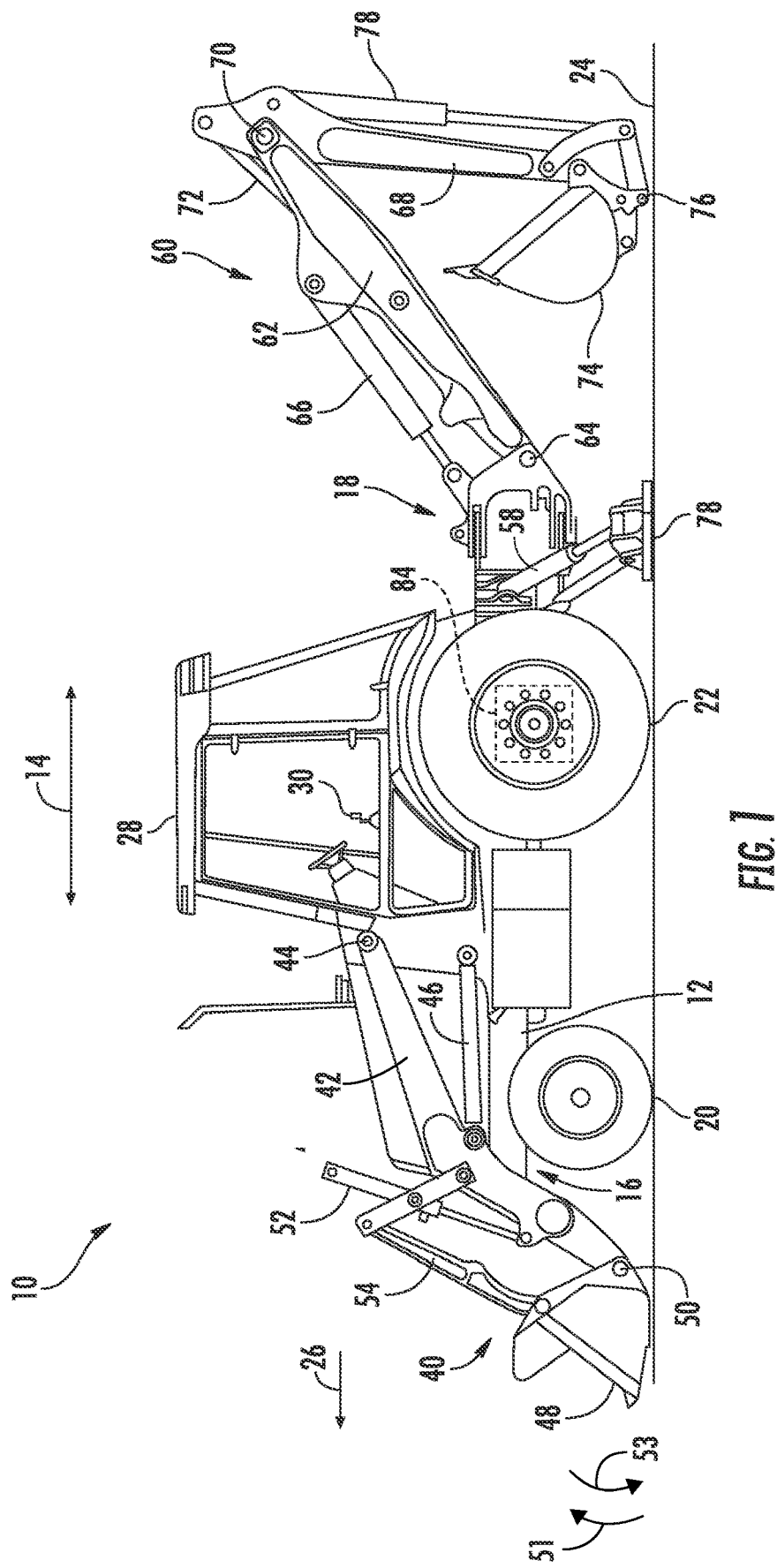
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically adjusting the position of an implement of a lift assembly of a work vehicle in order to maintain the implement at a fixed or constant angular orientation relative to a given reference point as the boom of the lift assembly is being raised or lowered. Specifically, in several embodiments, a computing system may be configured to execute closed-loop control when the boom at a raised position relative to the ground to eliminate or mitigate control instability at such raised position. As will be described below, with the boom at a raised position, automatic control of the implement angle is transitioned from simply feed-forward control to either closed-loop position control or closed-loop velocity control depending on the sign of the implement angle error (i.e., positive or negative). Specifically, when a positive implement angle error exists (i.e., when the implement has shifted in a rollback direction relative to the target implement angle), the control methodology may execute closed-loop position control (e.g., via a combination of both feed-forward and feedback control) to provide anti-rollback functionality and prevent issues associated with rollback conditions of the implement. Similarly, when a negative implement angle error exists (i.e., when the implement has shifted in a dump direction relative to the target implement angle), the control methodology may execute closed-loop speed control (e.g., via a combination of both feed-forward and feedback control) to shift the implement back towards the target implement angle.

In several embodiments, unlike the rollback control strategy, a certain buffer or "dump tolerance" may be applied before transitioning from the use of feed-forward control to closed-loop velocity control. In such embodiments, once the negative implement error exceeds the dump tolerance error, the implement control strategy is transitioned to the closed-loop velocity control to reduce the negative implement error and shift the implement angle back towards the target implement angle. As will be described below, upon switching to closed-loop velocity control, the control strategy may, in several embodiments, incorporate a ramp-up range to allow for the velocity-based control to be partially applied when the negative implement error initially exceeds the dump tolerance error and transitioned to full velocity-based closed-loop control with increases in the negative implement error.

Referring now to the drawings, FIG. 1 illustrates a side view of one embodiment of a work vehicle 10. As shown, the work vehicle 10 is configured as a wheel loader. However, in other embodiments, the work vehicle 10 may be configured as any other suitable work vehicle known in the art, such as any other work vehicle including a movable boom (e.g., any other type of front loader, such as skid steer loaders, backhoe loaders, compact track loaders, and/or the like).

Referring now to the drawings, FIG. 1 illustrates a side view of one embodiment of a work vehicle 10 in accordance with aspects of the present subject matter. As shown, the work vehicle 10 is configured as a backhoe loader (also often referred to as a "tractor-loader-backhoe" (TLB) or a "loader backhoe). However, in other embodiments, the work vehicle 10 may be configured as any other suitable work vehicle known in the art, such as any other work vehicle including a movable boom (e.g., any other type of front loader, such as skid steer loaders, wheel loaders, compact track loaders, and/or the like).

As shown in FIG. 1, the work vehicle 10 includes a frame or chassis 12 extending in a longitudinal direction (indicated by arrow 14 in FIG. 1) of the vehicle between a forward end 16 of the chassis 12 and an aft end 18 of the chassis 12. In general, the chassis 12 may be configured to support or couple to a plurality of components. For example, a pair of steerable front traction devices (e.g., front wheels 20 (one of which is shown)) and a pair of driven rear traction devices (e.g., rear wheels 22 (one of which is shown)) may be coupled to the chassis 12. The wheels 20, 22 may be configured to support the work vehicle 10 relative to a ground surface 24 and move the vehicle 10 along the ground surface 24 in a direction of travel, such as a forward direction of travel (e.g., as indicated by arrow 26 in FIG. 1). However, in alternative embodiments, the front wheels 20 may be driven in addition to or in lieu of the rear wheels 22. Additionally, an operator's cab 28 may be supported by a portion of the chassis 12 positioned between the forward and aft ends 16, 18 of the chassis 12, and may house one or more operator control devices 30 (e.g., a joystick(s), a lever(s), and/or the like) for permitting an operator to control the operation of the work vehicle 10.

The work vehicle 10 also includes a pair of hydraulically driven work implement assemblies or lift assemblies positioned at the opposed ends 16, 18 of the chassis 12. Specifically, in the illustrated embodiment, the work vehicle 10 includes a lift assembly 40 (also referred to herein as the "loader assembly 40") supported by or relative the chassis 12 at or adjacent to its forward end 16. As shown in FIG. 1, the loader assembly 40 includes a boom 42 pivotably coupled or supported relative to the chassis 12 at a boom pivot point 44, and a boom lift cylinder 46 secured between the boom 42 and the chassis 12. In such an embodiment, extension/retraction of the boom lift cylinder 46 may result in the boom 42 pivoting upwards/downwards about its respective pivot point 44, thereby allowing the positioning of the boom 42 relative to both the chassis 12 and the ground surface 24 to be adjusted, as desired. Moreover, as shown in FIG. 1, the loader assembly 40 further includes a first work implement 48, such as a loader bucket, coupled to the boom 42 at an implement pivot point 50, and a first implement tilt cylinder 52 secured between the work implement 48 (e.g., via a linkage(s) 54) and a portion of the boom 42. As such, by actuating the tilt cylinders 52 in one direction, the implement 48 being tilted upwardly in a rollback direction (as indicated by arrow 51 in FIG. 1). Similarly, by actuating the tilt cylinders 52 in the opposed direction, the implement 48 may tilted downwardly in a dump direction (as indicated by arrow 53 in FIG. 1). Thus, by controlling the operation of the lift and tilt cylinders 46, 52 of the loader assembly 40, the vertical positioning and orientation of the implement 48 may be adjusted to allow for the execution of one or more operations, such as one or more material-moving operations.

Additionally, the work vehicle 10 includes a lift assembly 60 (also referred to herein as a "backhoe assembly 60") supported by or relative the chassis 12 at or adjacent to its aft end 18. As shown in FIG. 1, the backhoe assembly 60 includes a boom 62 pivotably coupled or supported relative to the chassis 12 at a boom pivot point 64, and a boom lift cylinder 66 secured between the boom 62 and the chassis 12. In such an embodiment, extension/retraction of the boom cylinder 66 may result in the boom 62 pivoting upwards/downwards about its respective pivot point 64, thereby allowing the positioning of the boom 62 relative to both the chassis 12 and the ground surface 24 to be adjusted, as desired. The backhoe assembly 60 also includes a dipper arm 68 coupled to the boom 62 at a dipper pivot point 70, and a dipper cylinder 72 secured between the dipper arm 68 and the boom 62. In such an embodiment, extension/retraction of the dipper cylinder 72 may result in the dipper arm 68 pivoting upwards/downwards about its respective pivot point 70 relative to the boom 62. Moreover, as shown in FIG. 1, the backhoe assembly 60 further includes a second work implement 74, such as a dipper bucket, coupled to the dipper arm 68 at an implement pivot point 76, and a second implement tilt cylinder 78 secured between the work implement 74 and a portion of the dipper arm 68. As such, extension/retraction of the second implement tilt cylinder 78 may result in the second work implement 74 pivoting upwards/downwards relative to the dipper arm 68 about its respective pivot point 76, thereby permitting the tilt angle or orientation of the implement 74 to be adjusted, as desired. Thus, by controlling the operation of the various cylinders 66, 72, 78 of the backhoe assembly 60, the vertical positioning and orientation of the second work implement 74 may be adjusted to allow for the execution of one or more operations, such as one or more material excavation operations.

As shown in FIG. 1, the work vehicle 10 may also include a pair of stabilizer legs 56 (one of which is shown) positioned at or adjacent to the aft end 18 of the chassis 12. The stabilizer legs 56 may be configured to support the weight of the work vehicle 10 and/or otherwise stabilize the vehicle during the performance of a backhoe-related operation. For instance, the stabilizer legs 56 may be pivotably coupled to the chassis 12 to allow the legs 56 to be moved or pivoted (e.g., via the operation of an associated stabilizer leg cylinder 58) between a lowered position, at which the legs 56 contact the ground surface 24, and a raised position, at which the legs 56 are lifted off the ground surface 24 to allow the work vehicle 10 to be moved (e.g., in the forward direction of travel 26). It should be appreciated that, in addition to lowering the stabilizer legs 56, the loader assembly 40 may also be lowered during the performance of a backhoe-related operation such that the first work implement 48 contacts the ground, thereby providing a point-of-contact to stabilize the front end 16 of the chassis 12.

It should also be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
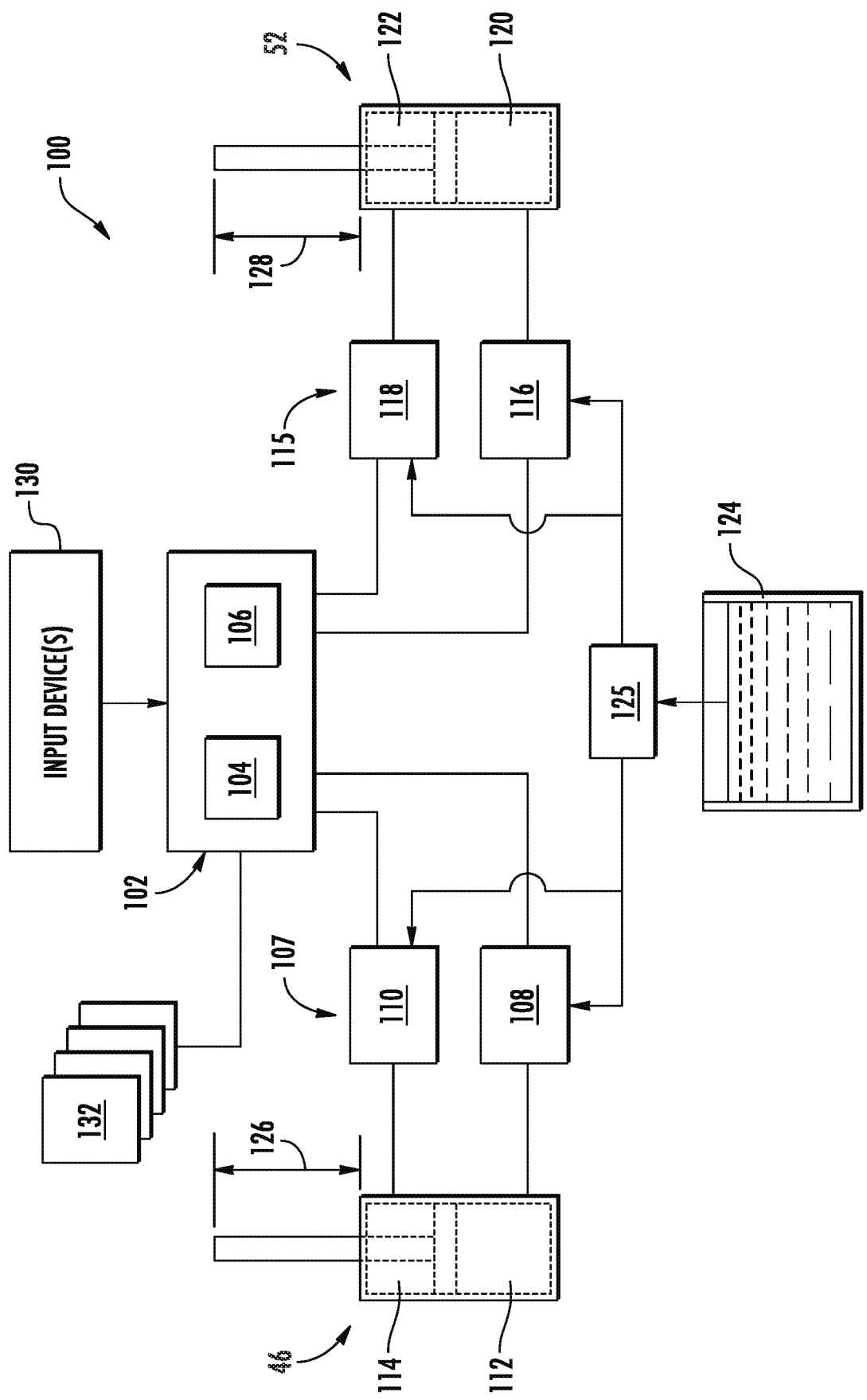
FIG. 2 illustrates a schematic view of one embodiment of a suitable control system for controlling the operation of various components of a work vehicle in accordance with aspects of the present subject matter, particularly illustrating the control system configured for controlling various hydraulic components of the work vehicle, such as the hydraulic cylinders of the work vehicle.

Referring now to FIG. 2, one embodiment of a control system 100 suitable for automatically controlling the operation of the various lift assembly components of a work vehicle is illustrated in accordance with aspects of the present subject matter. In general, the control system 100 will be described herein with reference to the work vehicle 10 and the loader assembly 40 described above with reference to FIG. 1. However, it should be appreciated by those of ordinary skill in the art that the disclosed system 100 may generally be utilized to the control the lift assembly components of any suitable work vehicle, in addition to the lift assembly components of the backhoe assembly 60 described above.

As shown, the control system 100 may generally include a computing system 102 configured to electronically control the operation of one or more components of the work vehicle 10, such as the various hydraulic components of the work vehicle 10 (e.g., the lift cylinders 46, the tilt cylinders 52 and/or the associated valve(s)). In general, the computing system 102 may comprise any suitable processor-based device known in the art, such as a computing device or any suitable combination of computing devices. Thus, in several embodiments, the computing system 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 of the computing system 102 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the computing system 102 to perform various computer-implemented functions, such as the logic, algorithms, and/or methods described below with reference to FIGS. 5-9. In addition, the computing system 102 may also include various other suitable components, such as a communications circuit or module, one or more input/output channels, a data/control bus and/or the like.

It should be appreciated that the computing system 102 may correspond to an existing controller of the work vehicle 10 or the computing system 102 may correspond to a separate processing device. For instance, in one embodiment, the computing system 102 may form all or part of a separate plug-in module that may be installed within the work vehicle 10 to allow for the disclosed system and method to be implemented without requiring additional software to be uploaded onto existing control devices of the vehicle 10.

In several embodiments, the computing system 102 may be configured to be coupled to suitable components for controlling the operation of the various cylinders 46, 52 of the work vehicle 10. For example, the computing system 102 may be communicatively coupled to a suitable lift valve assembly 107 including valves 108, 110 (e.g., solenoid-activated valves) configured to control the supply of hydraulic fluid to each lift cylinder 46 (only one of which is shown in FIG. 2). Specifically, as shown in the illustrated embodiment, the lift valve assembly 107 may include a first lift valve 108 for regulating the supply of hydraulic fluid to a cap end 112 of each lift cylinder 46. In addition, the lift valve assembly 107 may include a second lift valve 110 for regulating the supply of hydraulic fluid to a rod end 114 of each lift cylinder 46. Moreover, the computing system 102 may be communicatively coupled to a suitable tilt valve assembly 115 including valves 116, 118 (e.g., solenoid-activated valves) configured to regulate the supply of hydraulic fluid to each tilt cylinder 52 (only one of which is shown in FIG. 2). For example, as shown in the illustrated embodiment, the tilt valve assembly 115 may include a first tilt valve 116 for regulating the supply of hydraulic fluid to a cap end 120 of each tilt cylinder 52 and a second tilt valve 118 for regulating the supply of hydraulic fluid to a rod end 122 of each tilt cylinder 42. It should be appreciated that, in one embodiment, the lift valve assembly 107 and the tilt valve assembly 115 may form part of a valve block (not shown) of the work vehicle 10.

During operation, the computing system 102 may be configured to control the operation of each valve 108, 110, 116, 118 in order to control the flow of hydraulic fluid supplied to each of the cylinders 46, 52 from a suitable hydraulic tank 124 of the work vehicle 10 via an associated pump 125. For instance, the computing system 102 may be configured to transmit suitable control commands to the lift valves 108, 110 in order to regulate the flow of hydraulic fluid supplied to the cap and rod ends 112, 114 of each lift cylinder 46, thereby allowing for control of a stroke length 126 of the piston rod associated with each cylinder 46. Similarly, the computing system 102 may be configured to transmit suitable control commands to the tilt valves 116, 118 in order to regulate the flow of hydraulic fluid supplied to the cap and rod ends 120, 122 of each tilt cylinder 52, thereby allowing for control of a stroke length 128 of the piston rod associated with each cylinder 52. Thus, by carefully controlling the actuation or stroke length 126, 128 of the lift and tilt cylinders 46, 52, the computing system 102 may, in turn, be configured to automatically control the manner in which the boom 42 and the implement 48 are positioned or oriented relative to the vehicle's driving surface and/or relative to any other suitable reference point. For instance, the computing system 102 may be configured to cause the implement 48 to be tilted in the rollback direction 51 (FIG. 1) by controlling the operation of the tilt valve assembly 115 such that hydraulic fluid is supplied to one end of the tilt cylinders 52, thereby causing the cylinders 52 to be actuated in the corresponding direction. Similarly, the computing system 102 may be configured to cause the implement 48 to be tilted in the dump direction 53 (FIG. 1) by controlling the operation of the tilt valve assembly 115 such that hydraulic fluid is supplied to the opposed end of the tilt cylinders 52, thereby causing the cylinders 52 to be actuated in the corresponding direction.

It should be appreciated that the current commands provided by the computing system 102 to the various valves 108, 110, 116, 118 may be in response to inputs provided by the operator via one or more input devices 130. For example, one or more input devices 130 (e.g., the control lever(s) 30 shown in FIG. 1) may be provided within the cab 28 to allow the operator to provide operator inputs associated with controlling the position of the boom 42 and the implement 48 relative to the vehicle's driving surface (e.g., by varying the current commands supplied to the lift and/or tilt valves 108, 110, 116, 118 based on operator-initiated changes in the position of the control lever(s) 20). Alternatively, the current commands provided to the various valves 108, 110, 116, 118 may be generated automatically based on a suitable control algorithm being implemented by the computing system 102. For instance, as will be described in detail below, the computing system 102 may be configured to implement suitable control logic, algorithms, and/or methods for automatically controlling the angular orientation of the implement 48. In such instance, output signals or valve control commands generated by the computing system 102 when implementing such control logic, algorithms, and/or methods may be automatically transmitted to the tilt valve(s) 116, 118 to provide for precision control of the angular orientation/position of the implement 48.

Additionally, it should be appreciated that the work vehicle 10 may also include any other suitable input devices 130 for providing operator inputs to the computing system 102. For instance, in accordance with aspects of the present subject matter, the operator may be allowed to select/input a desired angular orientation for the implement 48 (e.g., a target implement angle). In such instance, the desired orientation may be selected or input by the operator using any suitable means that allows for the communication of such orientation to the computing system 102. For example, the operator may be provided with a suitable input device(s) 130 (e.g., a button(s), touch screen, lever(s), etc.) that allows the operator to select/input a particular angle at which the implement 48 is to be maintained during movement of the boom 42, such as a specified target implement angle defined relative to the vehicle's driving surface. In addition, or as an alternative thereto, the operator may be provided with a suitable input device(s) 130 (e.g., a button(s), touch screen, lever(s), etc.) that allows the operator to record or select the current angular orientation of the implement 48 as the desired or target implement angle, which may then be stored within the memory 106 of the computing system 102. Moreover, in one embodiment, one or more pre-defined implement orientation/position/angle settings may be stored within the memory 106 of the computing system 102. In such an embodiment, the operator may simply select one of the pre-defined orientation/position/angle settings in order to instruct the computing system 102 as to the target angle for the implement 48.

Moreover, as shown in FIG. 2, the computing system 102 may also be communicatively coupled to one or more position sensors 132 for monitoring the position(s) and/or orientation(s) of the boom 42 and/or the implement 48. In several embodiments, the position sensor(s) 132 may correspond to one or more angle sensors (e.g., a rotary or shaft encoder(s) or any other suitable angle transducer) configured to monitor the angle or orientation of the boom 42 and/or implement 48 relative to one or more reference points. For instance, in one embodiment, an angle sensor(s) may be positioned at a suitable location to allow the angle of the implement 48 relative to the boom 42 to be monitored. Similarly, an angle sensor(s) may be positioned at a suitable location to allow the angle of the boom 42 relative to a given reference point on the work vehicle 10 to be monitored. In addition to such angle sensor(s), or as an alternative thereto, one or more secondary angle sensors (e.g., a gyroscope, inertial sensor, etc.) may be mounted to the boom 42 and/or the implement 48 to allow the orientation of such component(s) relative to the vehicle's driving surface to be monitored.

In other embodiments, the position sensor(s) 132 may correspond to any other suitable sensor(s) that is configured to provide a measurement signal associated with the position and/or orientation of the boom 42 and/or the implement 48. For instance, the position sensor(s) 132 may correspond to one or more linear position sensors and/or encoders associated with and/or coupled to the piston rod(s) or other movable components of the cylinders 46, 52 in order to monitor the travel distance of such components, thereby allowing for the position of the boom 42 and/or the implement 48 to be calculated. Alternatively, the position sensor(s) 132 may correspond to one or more non-contact sensors, such as one or more proximity sensors, configured to monitor the change in position of such movable components of the cylinders 46, 52. In another embodiment, the position sensor(s) 132 may correspond to one or more flow sensors configured to monitor the fluid into and/or out of each cylinder 46, 52, thereby providing an indication of the degree of actuation of such cylinders 46, 52 and, thus, the location of the corresponding boom 42 and/or implement 48. In a further embodiment, the position sensor(s) 132 may correspond to a transmitter(s) configured to be coupled to a portion of one or both of the boom 42 and/or the implement 48 that transmits a signal indicative of the height/position and/or orientation of the boom/implement 42, 48 to a receiver disposed at another location on the vehicle 10.

It should be appreciated that, although the various sensor types were described above individually, the work vehicle 10 may be equipped with any combination of position sensors 132 and/or any associated sensors that allow for the position and/or orientation of the boom 42 and/or the implement 48 to be monitored. For instance, in one embodiment, the work vehicle 10 may include both a first set of position sensors 132 (e.g., angle sensors) associated with the pins located at the pivot joints defined at the pivot points 30, 34 for monitoring the relative angular positions of the boom 42 and the implement 48 and a second set of position sensors 132 (e.g., a linear position sensor(s), flow sensor(s), etc.) associated with the lift and tilt cylinders 46, 52 for monitoring the actuation of such cylinders 46, 52.

Additionally, it should be appreciated that the computing system 102 may also be coupled to various other sensors for monitoring one or more other operating parameters of the work vehicle 10. For instance, the computing system 102 may also be coupled to one or more pressure sensors configured to monitor the fluid pressure of the hydraulic fluid at one or more locations within the system 100 and/or one or more temperature sensors configured to monitor the temperature of the hydraulic fluid supplied between the tank 124 and the various cylinders 46, 52. In addition, the computing system 102 may be coupled to one or more velocity sensors and/or accelerometers (not shown) for monitoring the velocity and/or acceleration of the boom 42 and/or the implement 48.

It should also be appreciated that, as used herein, the term "monitor" and variations thereof indicates that the various sensors of the system 100 may be configured to provide a direct or indirect measurement of the operating parameters being monitored. Thus, the sensors may, for example, be used to generate signals relating to the operating parameter being monitored, which can then be utilized by the computing system 102 to determine or predict the actual operating parameter.

In addition, it should be appreciated that, as described herein, the computing system 102 may be configured to receive a signal indicative of a given operating parameter or state of the work vehicle 10 from an external source (e.g., from a sensor coupled to the computing system 102) or from an internal source. For example, signals transmitted to, within and/or from the processor(s) 104 and/or memory 106 of the computing system 102 may be considered to have been "received" by the computing system 102. Thus, in embodiments in which the computing system 102 is utilizing a constant value for a given operating parameter of the work vehicle (e.g., the hydraulic pressure and/or the fluid temperature), a signal indicative of such operating parameter may be received by the computing system 102 when the constant value is, for example, retrieved from memory by the processor(s) 104 and/or utilized by the processor(s) 104 as an input within a given processing step.

Figure 3:
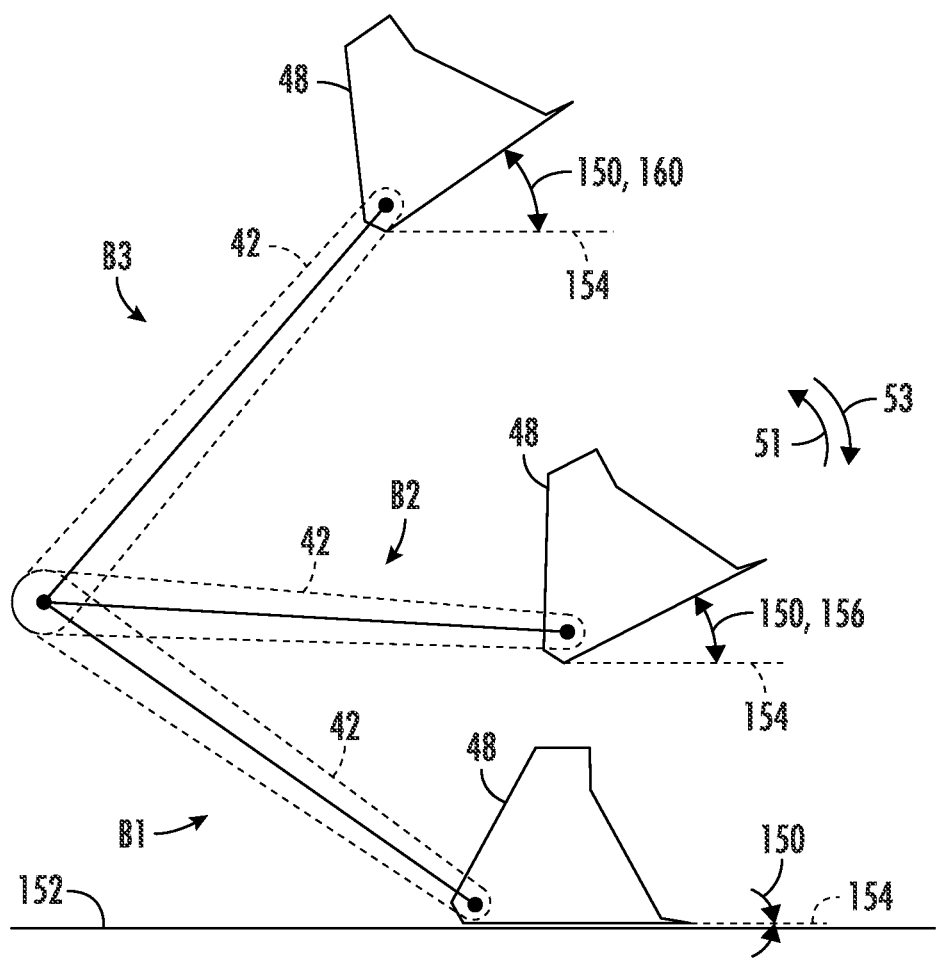
FIG. 3 illustrates schematic views of an exemplary boom and implement in accordance with aspects of the present subject matter, particularly illustrating a progression of boom/implement positions as the boom is being raised from a lowered position to a raised position.

Referring now to FIG. 3, schematic views of an exemplary boom 42 and implement 48 of a lift assembly are illustrated in accordance with aspects of the present subject matter, particularly illustrating a progression of boom/implement positions as the boom 42 is being raised from a lowered position (i.e., position B1) to a raised position (i.e., position B3). Specifically, the boom 42 is shown as being raised from the lowered position B1 across an intermediate position (i.e., position B2) to the raised position B3. In the illustrated example, the implement 48 is shown at a dig orientation when the boom 42 is at the lowered position B1, wherein an implement angle 150 of the implement 48 relative to the vehicle's driving surface 152 (e.g., relative to a reference horizontal plane extending generally parallel to the driving surface as indicated by lines 154 in FIG. 3) is equal to approximately zero degrees. At the intermediate position B2, the implement 48 is shown at a transition orientation wherein the implement angle 150 of the implement 33 relative to the driving surface is equal to a dump transition angle 156. Additionally, at the raised position B3, the implement 48 is shown at a target orientation wherein the implement angle 150 of the implement 48 relative to the driving surface is equal to the target implement angle 160 (e.g., an operator-selected angle defined relative to the vehicle's driving surface). It should be appreciated that, for purposes of discussion, the "implement angle" is generally described and shown herein as corresponding to the angular orientation of the bottom surface of the implement 48 relative to the vehicle's driving surface. However, in general, the implement angle 150 may be defined relative to any other reference location on the implement 48.

For purposes of discussion with reference to FIG. 3, it will be assumed that the operator has commanded movement of the boom 42 from the lowered position B1 to the raised position B3, such as by providing a suitable input(s) commanding such movement. For instance, the operator may manipulate a joystick or button to command movement from the lowered position B1 to the raised position B3. Additionally, it will be assumed that the operator has enabled an automatic implement leveling function configured to execute one or more embodiments of the disclosed control logic, algorithms, and/or methods for automatically actuating the implement 48 to (and maintaining the implement 48 at) the target implement angle 160 during boom movement. The various details of one or more embodiments of the disclosed control logic, algorithms, and/or methods will be described below with reference to FIGS. 5-9.

Due to the structural configuration of the lift assembly 40, the angular orientation of the implement 48 relative to the vehicle's driving surface will naturally change as the boom 42 is being raised assuming no actuation of the associated tilt cylinders 52. Specifically, as the boom 42 is raised without any actuation of the tilt cylinders 52, the implement angle 150 will naturally increase, thereby resulting in the angular orientation of implement 48 relative to the vehicle's driving surface to shift in the rollback direction 51. As such, when raising the boom 42 from the lowered position B1 to the raised position B3, the motion of the boom 42, itself, will result in the implement angle 150 increasing from the zero angle or dig orientation shown at the lowered position B1 towards the target implement angle 160 without requiring activation of the tilt cylinders 52. However, as the implement angle 150 increases towards the target implement angle 160 with upward movement of the boom 42, it is generally desirably to slow the natural rollback rate of the implement 48 to avoid overshooting the target implement angle 160 and prevent an excessive rollback condition. To achieve this, the tilt cylinders 52 may be actuated to gradually tilt the implement 48 in the dumping direction 53 (e.g., at a dump rate that is less than the natural rollback rate achieved due to the upward motion of the boom 42) to slow the overall or effective rollback rate of the implement 48 as it transitions towards the target implement angle 150.

In this regard, in several embodiments, aspects of the disclosed control logic, algorithms, and/or methods (as will be described in greater detail below) may be configured to begin to actuate the tilt cylinders 52 to tilt the implement 48 in the dumping direction 53 as the boom 42 is being raised once the implement angle 150 reaches a dump transition angle 156 (i.e., the implement angle 150 shown at the intermediate position B2). Specifically, in several embodiments, as the boom 42 is being initially raised from the lowered position B1, the tilt cylinders 52 may remain inactive to allow the implement angle 150 to increase due to the natural rollback of the implement 48 occurring with lifting of the boom 42 until the implement angle 150 reaches the dump transition angle 156 (i.e., at intermediate position B2). At this point, actuation of the tilt cylinders 52 may be controlled (e.g., using a feed-forward control sub-algorithm to control the tilt valve assembly 115) to cause the implement 48 to be actuated in the dumping direction 53 at a given rate so as to partially counteract the natural rollback of the implement 48, thereby slowing or decreasing the effective rollback rate of the implement 48 as the boom 42 continues to be moved from the intermediate position B2 towards the raised position B3. At the raised position B3, it is assumed that the implement angle 150 has initially reached the target implement angle 160.

It should be appreciated that the dump transition angle 156 may generally correspond to any suitable angle that is less than the target implement angle 160. For example, in one embodiment, the dump transition angle 156 may correspond to an angle equal to the target implement angle 160 less a given offset angle (e.g., 15 degrees).

Once the boom 42 reaches the raised position B3, assuming ideal conditions, the actuation rate of the tilt cylinders 52 could, in theory, simply be selected based on the actuation rate of the lift cylinders 46 in order to maintain the implement 48 at the target implement angle 160. For example, if the boom 42 is being further lifted from the raised position B3, the rate at which the implement 48 is actuated in the dump direction 53 could be selected based on the lift speed of the boom 42 to maintain the implement 48 at the target implement angle 160. Similarly, if the boom 42, instead, is being lowered from the raised position B3, the rate at which the implement 48 is actuated in the rollback direction 51 could be selected based on the lowering speed of the boom 42 to maintain the implement 48 at the target implement angle 160. However, due to various conditions/factors (e.g., the non-linear kinematics of the loader assembly 40 and the loading interaction with the vehicle's tires), the use of a feed-forward control strategy alone can become very unstable at raised boom positions (e.g., at position B3), thereby leading to inaccuracies in the implement angle 150 (e.g., relative to the target implement angle 160). Such instability can result in material being dropped from the implement 48 (e.g., onto the top of the operator's cab).

Figure 4:
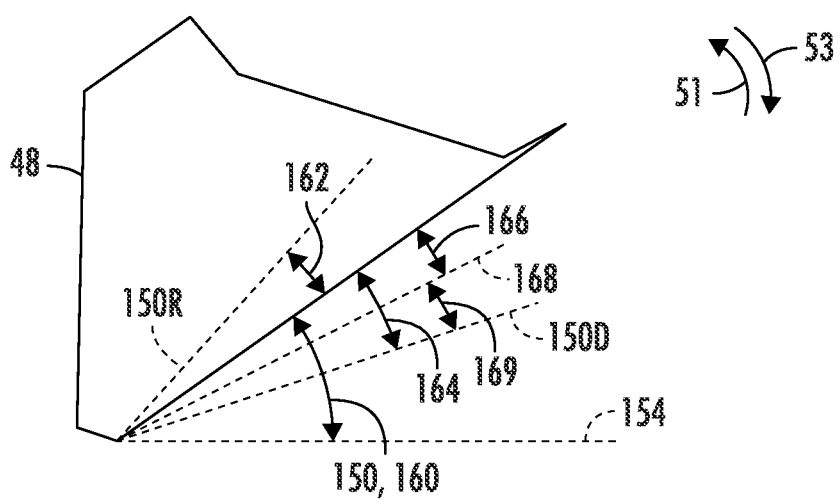
FIG. 4 illustrates a view of the implement orientation shown in FIG. 3 when the boom is at the raised position, particularly illustrating various reference angles and associated angle errors relative to the target implement angle.

For example, FIG. 4 illustrates a view of the implement orientation shown in FIG. 3 when the boom 42 is at the raised position B3. As shown, the implement 48 is oriented at the target implement angle 160 relative to the vehicle's driving surface (e.g., relative to the horizontal reference plane 154 shown in FIG. 4). Due to the inaccuracy associated with the use of feed-forward control alone at raised boom positions, an implement angle error may exist relative to the target implement angle 160, with the implement angle error being equal to the current implement angle 150 minus the target implement angle 160. A positive implement angle error occurs when the implement 48 has rolled back or otherwise shifted in the rollback direction 51 relative to target implement angle 160, such as the positive angle error 162 shown in FIG. 4 between the target implement angle 160 and a reference implement angle indicated by line 150R. Similarly, a negative implement angle error occurs when the implement 48 has shifted in the dump direction 53 relative to target implement angle 160, such as the negative angle error 164 shown in FIG. 4 between the target implement angle 160 and a reference implement angle indicated by line 150D.

As will be described below with reference to FIG. 5, to eliminate or mitigate control instability at raised boom positions, the automatic control of the implement angle 150 will be transitioned from simply feed-forward control to either closed-loop position control or closed-loop velocity control depending on the sign of the implement angle error (i.e., positive or negative). Specifically, when a positive implement angle error exists (i.e., when the implement 48 has shifted in the rollback direction 51 relative to the target implement angle 160), the control methodology may execute closed-loop position control (e.g., via a combination of both feed-forward and feedback control) to provide anti-rollback functionality and prevent issues associated with rollback conditions of the implement 48. Similarly, when a negative implement angle error exists (i.e., when the implement 48 has shifted in the dump direction 53 relative to the target implement angle 160), the control methodology may execute closed-loop speed control (e.g., via a combination of both feed-forward and feedback control) to shift the implement 48 back towards the target implement angle 160. However, in several embodiments, unlike the rollback control strategy, a certain buffer or "dump tolerance" may be applied before transitioning from the use of feed-forward control to closed-loop velocity control. For example, as shown in FIG. 4, a dump error tolerance 166 may be defined between the implement target angle 160 and a control transition implement angle (indicated by reference line 168 in FIG. 4) across which the implement control strategy is maintained as simply feed-forward control. However, once the negative implement error exceeds the dump tolerance error 166, the implement control strategy is transitioned to the closed-loop velocity control to reduce the negative implement error and shift the implement angle 150 back towards the target implement angle 160. Accordingly, the disclosed control methodology may provide strict anti-rollback functionality while allowing some tolerance band in the dumping direction 53 as errors in the implement angle 150 (e.g., relative to the target implement angle 160) occur with movement of the boom 42.

Moreover, in several embodiments, the transition to closed-loop velocity control may incorporate a ramp-up range across which the closed-loop velocity control is ramped-up or increased from no or 0% velocity-based control to full or 100* velocity-based control. For instance, as shown in FIG. 4, a ramp-up angular range 169 may be defined between the control transition implement angle 168 and a full velocity control implement angle 150D across which the closed-loop velocity control is ramped-up from 0% velocity-based control (e.g., at angle 168) to 100% velocity-based control (e.g., at angle 150D). In one embodiment, such a ramp-up in the velocity-based control may be implemented by multiplying the velocity-based feedback signal (which will be described below with reference to FIG. 8) by a correction factor ranging from zero (0) to one (1). In such an embodiment, the correction factor may increase linearly across the ramp-up angular range 169 from zero (0) at angle 168 to one (1) at angle 150D.

It should be appreciated that the dump tolerance error 166 and the ramp-up angular range 169 may generally correspond to any suitable angle or angular range. For instance, as an example, the dump tolerance error 166 may correspond 0.5 degrees such that feed-forward control is executed when the negative implement error falls between zero and negative 0.5 degrees. Additionally, as an example, the ramp-up angular range 169 may span across 0.5 degrees such that the velocity-based control is ramped up as the negative implement error increases from negative 0.5 degrees to negative 1 degree, with fully velocity-based control being executed at negative implement angle errors of 1 degree or greater.

Figure 5:
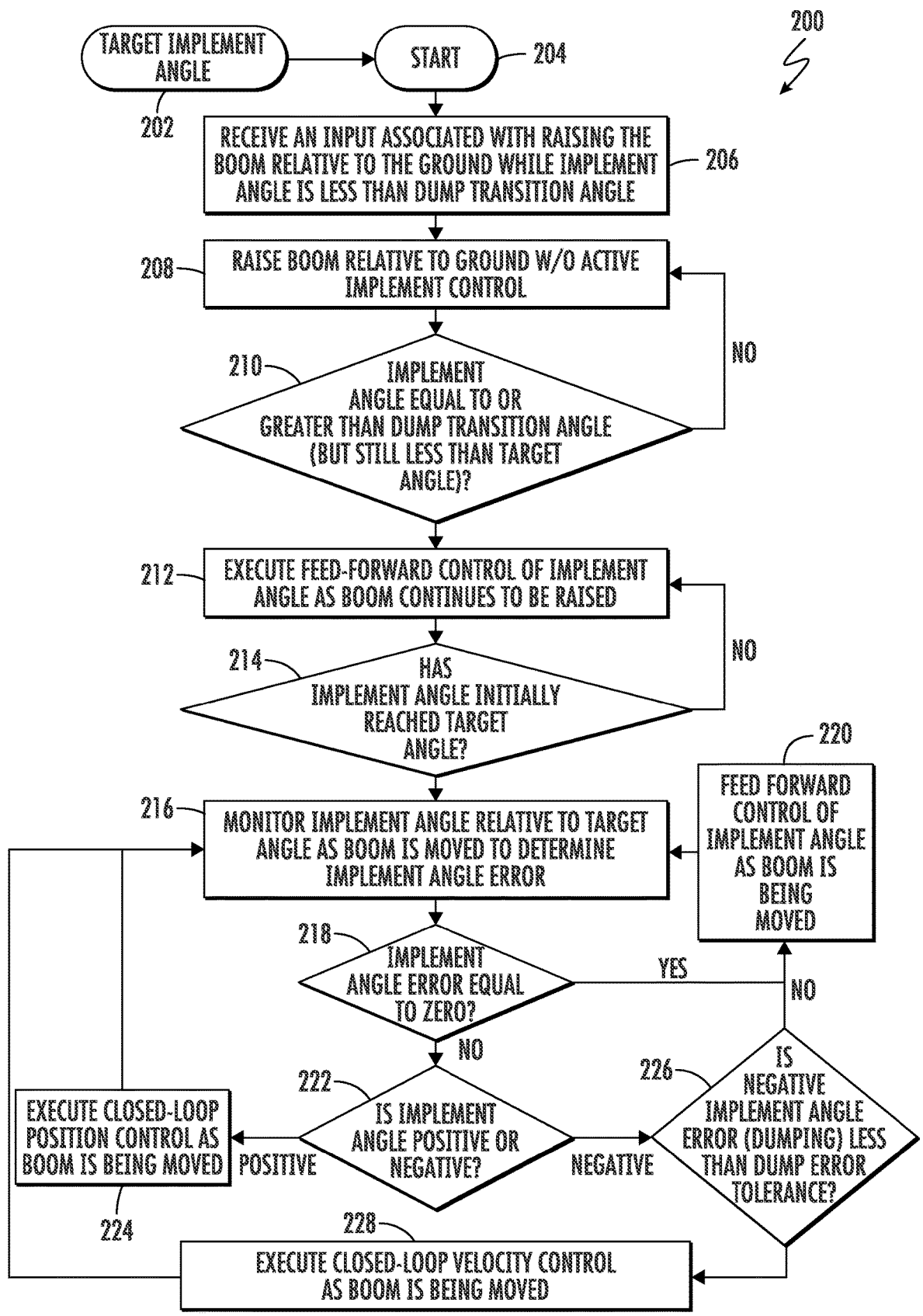
FIG. 5 illustrates a flow diagram of one embodiment of control logic 200 for automatically adjusting the position of an implement of a work vehicle in accordance with aspects of the present subject matter.

Referring now to FIG. 5, a flow diagram of one embodiment of control logic 200 that may be implemented by the computing system 102 (FIG. 2) for automatically adjusting the position of an implement 48 of a work vehicle 10 is illustrated in accordance with aspects of the present subject matter. Specifically, the control logic 200 is representative of steps of one embodiment of a control method or algorithm that can be executed to maintain an implement 48 at a desired or target implement angle 160 during movement of the boom 42 while providing rollback prevention. For example, as will be described below, the control logic 200 is designed to execute closed-loop position control upon the detection of any positive implement angle error, thereby allowing the system to quickly counteract and prevent further movement of the implement 48 in the rollback direction 51. However, the control logic 200 may be configured to accommodate a certain amount of movement in the dumping direction 53 (e.g., the dump tolerance error 166 (FIG. 4)) before executing closed-loop velocity control to reduce the associated negative implement angle error.

It should be appreciated that, for purposes of describing the control logic 200, it will be assumed that the boom 42 is being raised from a lowered position (e.g., position B1 of FIG. 3 or from a similar position wherein the implement angle 150 is less than the dump transition angle 156 (FIG. 3) to a raised position (e.g., a position at or similar to position B3 of FIG. 3). However, one of ordinary skill in the art will readily understand that portions or aspects of the control logic 200 may be executed regardless of the starting position of the boom 42. For instance, once the implement angle 150 initially reaches the target implement angle 160 when raising the boom 42, the portions of the control logic 200 associated with the control steps thereafter may be executed to maintain the implement 48 at the target implement angle 160 as the boom is being moved thereafter.

It should also be appreciated that the control logic 200 will be described herein with reference to the work vehicle shown in FIG. 1 and the system 100 shown in FIG. 2. However, it should be appreciated by those of ordinary skill in the art that the disclosed logic 200 may generally be utilized in association with work vehicles having any other suitable vehicle configuration and/or systems having any other suitable system configuration. In addition, although FIG. 5 depicts steps performed in a particular order for purposes of illustration and discussion, the logic and related methods/algorithms discussed herein are not limited to any particular order or arrangement. One skilled in the art, using the disclosures provided herein, will appreciate that various steps of the logic and related methods/algorithms disclosed herein can be omitted, rearranged, combined, and/or adapted in various ways without deviating from the scope of the present disclosure.

As shown in FIG. 5, prior to initiation of the control logic 200 (e.g., at (204)), the computing system 102 may, at (202), be configured to receive an input associated with a desired or target implement angle 160 for the implement 48. For instance, as indicated above, the operator may be provided with a suitable input device(s) 130 (FIG. 2) (e.g., a button(s), touch screen, lever(s), etc.) that allows the operator to select/input a particular angle at which the implement 48 is to be maintained during movement of the boom 42. In another embodiment, one or more pre-defined implement orientation/position/angle settings may be stored within the memory 106 of the computing system 102. In such an embodiment, the operator may simply select one of the pre-defined orientation/position/angle settings in order to instruct the computing system 102 as to the target implement angle for the implement 48.

Upon initiation of the control logic 200, the computing system 102 may, at (206), be configured to receive an input associated with raising the boom 42 relative to the ground while the implement angle 150 is less than the dump transition angle 156. As indicated above, the control logic 200 illustrated in FIG. 5 assumes that, upon initial activation of boom movement, the implement 48 is initially positioned at an implement angle 150 that is less than the dump transition angle 156. For instance, the implement 48 may be positioned at the dig orientation shown in FIG. 3 (e.g., at an implement angle 150 equal to approximately zero degrees) or any orientation associated with an implement angle 150 less than the dump transition angle 156. In other instances, the implement 48 may be initially positioned at an implement angle 150 that is greater than the dump transition angle 156, but still less than the target implement angle 160. In such instances, the control logic 200 may be configured to initiate at step (212) (described below).

It should be appreciated that the input received at (206) may generally correspond to any suitable input associated with commanding the boom 42 to be raised relative to the ground. For instance, as indicated above, the operator may be provided with a suitable input device(s) 130 (FIG. 2) (e.g., a joystick or lever) that allows the operator to command movement of the boom 42, such as by moving a joystick in a direction associated with raising the boom 42. In another embodiment, one or more pre-defined boom position settings may be stored within the memory 106 of the computing system 102. In such an embodiment, the operator may select one of the pre-defined boom position settings in order to instruct the computing system 102 as to the desired boom position. For example, assuming the raised position shown in FIG. 3 is stored as a pre-defined boom position, the operator may select such position and initiate movement of the boom 42, at which point the computing system 102 may be configured to automatically control the operation of the lift valve assembly 107 (and, thus, the operation of the lift cylinders 46) to raise the boom 42 to the selected position.

At (208), in response to the receipt of the input, the computing system 102 may be configured to raise the boom 42 relative to the ground without any active implement control (i.e., no active control of the tilt valves 116, 118). As indicated above, due to the structural configuration of the lift assembly 40, the angular orientation of the implement 48 relative to the vehicle's driving surface will naturally increase as the boom 42 is being raised (assuming no actuation of the associated tilt cylinders 52), thereby resulting in the angular orientation of implement 48 relative to the vehicle's driving surface to shifting in the rollback direction 51. As such, when initially raising the boom 42 when the implement angle 150 is less than the dump transition angle 156, the motion of the boom 42, itself, will result in the implement angle 150 increasing towards the dump transition angle 156 without requiring activation of the tilt cylinders 52. Accordingly, the control logic 200 may be adapted to take advantage of this natural rollback of the implement 48 as the computing system 102 initially begins to raise the boom 42.

Additionally, as the boom is being raised relative to the ground, the computing system 102 is, at (210), configured to determine whether the implement angle 150 is equal to or greater than the dump transition angle 156 (but still less than the implement target angle 160). If the implement angle 150 is still less than the dump transition angle 156, the control logic 200 continues to execute (208), wherein the boom 42 continues to be raised without any active implement control to allow the natural rollback of the implement 48 to result in the implement angle 150 being further increased towards the dump transition angle 156. However, once the implement angle 150 reaches the dump transition angle 156, the computing system 102 may, at (212), be configured to implement a feed-forward control strategy as the boom 42 continues to be raised. Specifically, as indicated above, once the implement angle 150 reaches the dump transition angle 156, it is generally desirable to control the operation of the tilt valves 116, 118 to regulate the actuation of the tilt cylinders 52 (e.g., using a feed-forward control sub-algorithm) to cause the implement 48 to be actuated in the dumping direction 53 at a given rate so as to partially counteract the natural rollback of the implement 48, thereby slowing or decreasing the effective rollback rate of the implement 48 as the boom 42 continues to be raised relative to the ground.

Figure 6:
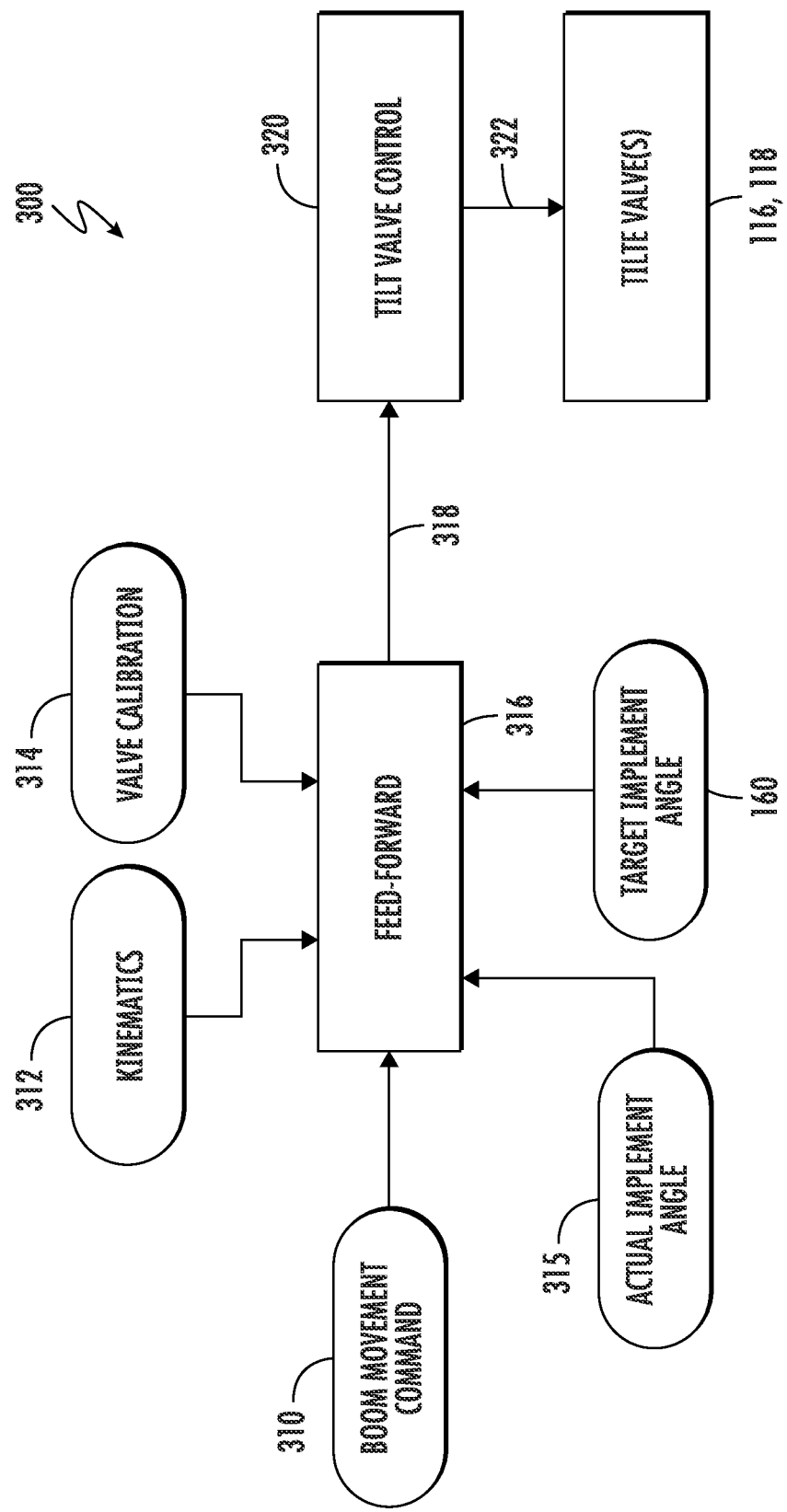
FIG. 6 illustrates a flow diagram of one embodiment of a feed-forward control sub-algorithm that may be utilized when controlling angular orientation of the implement in accordance with aspects of the present subject matter.

An example of a suitable feed-forward control sub-algorithm 300 that may be utilized at (212) to control the operation of the tilt valve(s) 116, 118 is illustrated in FIG. 6. As shown in FIG. 6, when executing the feed-forward control sub-algorithm 300, various input signals 160, 310, 312, 314 may be input into a feed-forward block 316 to allow a feed-forward control signal 318 to be generated by the computing system 102. For instance, in the illustrated embodiment, in addition to the desired or target implement angle (e.g., box 160), additional inputs, such as a boom movement command (e.g., box 310), kinematics data (e.g., box 312), valve calibration data (e.g., box 314), and the actual implement angle (e.g., box 315) may be input into the feed-forward block 316. The boom movement command 310 may, in one embodiment, correspond to the operator input command (e.g., a joystick command) associated with the direction and speed at which the boom 42 is being moved. For instance, when boom movement is controlled via a joystick, the direction in which the joystick actuated (e.g., forward or backwards) will indicate the commanded direction of boom movement (e.g., lowering or raising) while the magnitude of the joystick actuation will indicate the commanded boom velocity. Thus, assuming the boom 42 is being raised, the joystick command may be primarily used within the feed-forward control sub-algorithm 300 to identify the speed at which the boom 42 is being moved (or commanded to be moved). In another embodiment, the boom movement command 310 may be associated with movement of the boom 42 to a pre-defined position (e.g., to an operator-selected position), in which case the boom speed may correspond to a predetermined boom speed or the boom speed may be commanded by the operator (e.g., via the joystick). The kinematics signal 312 may generally be associated with the geometry of the lift assembly 40, particularly the geometry of the boom 42, which can be used by the feed-forward block 316 to account for changes in the boom dynamics as the boom 34 is being raised relative to the ground. The valve calibration signal 318 may include calibration data for the control valves (e.g., the lift valve assembly 107 and/or the tilt valve assembly 115) to allow the computing system 102 to take into account any offsets or other predetermined values associated with controlling the valves.

In general, the feed-forward control signal 318 may correspond to a speed control signal that, based on the input signals, is associated with a calculated rate of change or velocity at which the implement 48 needs to be actuated in order to reduce the implement's rollback rate 48 as the boom 42 is being raised in an attempt to prevent the implement 48 from overshooting the target implement angle 160. For instance, as indicated above with reference to FIG. 5, the feed-forward control sub-algorithm 300 may be used at (212) to cause the implement 48 to be actuated in the dumping direction 53 at a given rate so as to partially counteract the natural rollback of the implement 48, thereby slowing or decreasing the effective rollback rate of the implement 48 as the boom 42 continues to be raised relative to the ground. Accordingly, given the speed or velocity at which the boom 42 is being raised (and the associated natural rollback rate of the implement 48), the feed-forward control signal 318 may be selected to allow the tilt cylinders 52 to the actuated in the dumping direction 53 in a manner that results in an effective rollback rate of the implement 48 that is equal to desired to target rollback rate for the implement 48. In one embodiment, when the operator has indicated that the boom 42 is to be raised to a pre-defined boom position, the feed-forward control signal 318 may be selected such that the effective rollback rate of the implement 48 results in the implement 48 reaching the target implement angle 160 simultaneous with (or close in time with) the boom 42 reaching the commanded or selected boom position.

As shown in FIG. 6, the feed-forward control signal 318 generated by the feed-forward control block 316 may be input into a tilt valve control block 320 configured to generate a valve control command 322. The valve control command 322 may then be used for controlling the operation of the tilt valves 116, 118 to ensure proper actuation of the tilt cylinders 52 as the boom 42 is being raised.

Referring back to FIG. 5, as the feed-forward control strategy is being executed at (212) to increase the implement angle 150 from the dump transition angle 156 to the target implement angle 150, the computing system 102 may be configured to continuously monitor the implement angle 150. As shown in FIG. 5, as part of such monitoring, the computing system 102 may, at (214), be configured to determine whether the implement angle 150 has initially reached the target implement angle 160. If not (meaning the implement angle 150 is still between the dump transition angle 156 and the target implement angle 160), the computing system 102 may continue to execute feed-forward control via (212) to further increase the implement angle 150 towards the target implement angle 160. However, once the implement angle 150 has initially reached the target implement angle 160, the computing system 102 may thereafter, at (216), continue monitoring the implement angle 150 relative to the target implement angle 156 to determine whether further movement of the boom 42 results in an implement angle error (i.e., where a differential exists between the actual implement angle 150 and the target implement angle 160). As indicated above, a positive implement angle error occurs when the implement 48 has rolled back or otherwise shifted in the rollback direction 51 relative to target implement angle 160, while a negative implement angle error occurs when the implement 48 has shifted in the dump direction 53 relative to the target implement angle 160.

As shown in FIG. 5, as part of such implement angle monitoring, the computing system 102 may, at (218), be configured to determine whether any implement angle error currently exists. If no implement angle error exists (i.e., because the implement 48 is currently positioned at the target implement angle 160 such that the error is equal to zero), the computing system may, at (220), simply continue to execute feed-forward control (e.g., in a manner similar to the sub-algorithm 300 shown in FIG. 6) without requiring any closed-loop control. However, if an implement angle error actually exists, the computing system 102 may, at (222), be configured to determine the sign of the implement angle error (i.e., whether the error is positive or negative). In the event it is determined that a positive implement angle error exists, the computing system 102 may, at (224), be configured to execute closed-loop position control to ensure that the implement angle is quickly and effectively returned back to the target implement angle 160 and to prevent further rollback of the implement 48.

Figure 7:
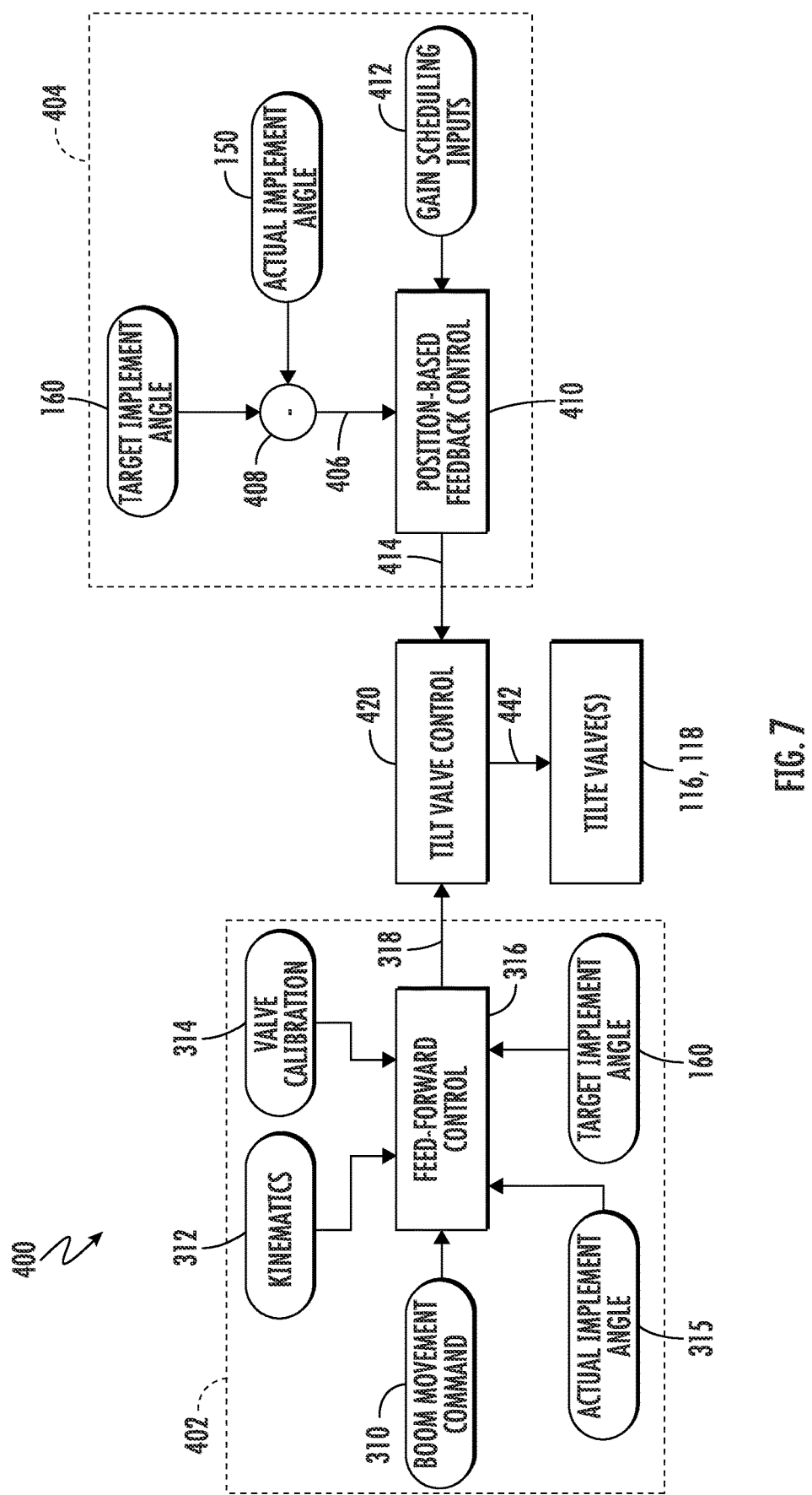
FIG. 7 illustrates a flow diagram of one embodiment of a closed-loop position control sub-algorithm that may be utilized when controlling angular orientation of the implement in accordance with aspects of the present subject matter.

An example of a suitable closed-loop position control sub-algorithm 400 that may be utilized at (224) to control the operation of the tilt valve 116, 118 is shown in FIG. 7. As shown in FIG. 7, in several embodiments, the closed-loop position control sub-algorithm 400 may employ both a feed-forward control portion (indicated by dashed box 402 in FIG. 7) and a feedback control portion (indicated by dashed box 404 in FIG. 7). The feed-forward control 402 may generally allow for the control algorithm 400 to reduce delays within the system, thereby increasing the system's responsiveness in relation to controlling the tilt valves 116, 118 and the corresponding tilt cylinders 52 of the vehicle's lift assembly 40. In addition, the feedback control 404 may allow for error-based adjustments to be made to the control signals generated by the computing system 102 that take into account variables not accounted for by the feed-forward control 402 (e.g., how loading, non-linear kinematics, and/or other variables may impact the responsiveness and/or effectiveness of the position control for the implement 48).

Similar to that described above with reference to FIG. 6, the feed-forward control portion 402 of the disclosed algorithm 400 may be configured to receive one or more input signals, such as the target implement angle (e.g., box 160), the boom movement command (e.g., box 310), kinematics data (e.g., box 312), valve calibration data (e.g., box 314), the actual implement angle (e.g., box 315) and the like. The various input signals may then be input into a feed-forward block 316 in order to generate a feed-forward output signal 318. As indicated above, the feed-forward control signal 318 may correspond to a speed control signal that, based on the input signals, is associated with a calculated rate of change or speed at which the implement 48 needs to be moved in order to maintain the implement 48 at the target implement angle 160 as the boom 42 is being moved.

Additionally, the feedback control 404 may be configured to determine the error between the actual and target implement angles, which may then be used to adjust the calculated implement speed associated with the feed-forward control signal 318. Thus, as shown in FIG. 7, the feedback control portion 404 may be configured to receive position-related input signals, namely a target implement angle signal 160 and an actual implement angle signal 150, and, based on such input signals 150, 160, generate a corresponding difference or error signal 406 (e.g., via the difference block 408). The error signal 408 may then be input into a feedback function block 410 (along with any suitable gain scheduling inputs 412) to generate a feedback control signal 410 that may serve as an adjustment or correction factor for modifying the feed-forward output signal 318. For instance, the feedback control signal 414 may correspond to a speed correction factor that may be used to modify the implement speed associated with the feed-forward control signal 318.

It should be appreciated that the additional gain scheduling inputs 412 that are input into the feedback function block 410 may correspond to numerous different inputs that may be taken into account when scheduling or calculating gains to be applied for closed-loop, positioned-based feedback control. For instance, the control gain(s) utilized by the feedback function block 410 may vary based on any number of suitable vehicle parameters that may impact the responsiveness of the hydraulic system components. For example, in one embodiment, the gain scheduling inputs 412 may include inputs associated with the engine speed (e.g., in RPMs), the temperature of the hydraulic fluid contained within the hydraulic system, the pressure of the hydraulic fluid supplied within the various hydraulic cylinders, the velocity of the boom 42 and/or implement 48 and/or the acceleration of the boom 42 and/or implement 48. However, in other embodiments, the gain scheduling inputs 412 may correspond to any other input signal or combination of input signals.

As shown in FIG. 7, the control signals 318, 414 generated by the feed-forward and feedback control portions 402, 404 may then be input into a tilt valve control block 420 configured to generate a valve control command 422 for controlling the operation of the tilt valve(s) 116, 118. Specifically, in several embodiments, the calculated implement speed associated with the feed-forward output signal 318 may be adjusted based on the calculated speed correction factor associated with the feedback output signal 414 so as to produce a final adjusted speed for the implement 48. Thereafter, the adjusted speed value may be converted into a suitable valve control command 422 that may be transmitted to the tilt valves 116, 118 in order to control the operation of the valves 116, 118 in a manner that causes the implement 48 to be shifted back towards the target implement angle 160 as the boom 42 is being moved.

It should be appreciated that the feed-forward and feedback output signals 318, 414 may be combined or otherwise processed in any suitable manner in order to generate the final valve control command(s) 422. For instance, in one embodiment, one of the signals may be used as a multiplier or modifier to adjust the other signal. In another embodiment, the feed-forward and feedback output signals 318, 414 may simply be summed to generate the final valve control command(s) 422.

Referring back to FIG. 5, as indicated above, at (222), the computing system 102 is configured to determine whether the implement angle error is positive or negative. If a positive implement angle error exists, the computing system 102 is, at (224), configured to execute closed-loop position control (e.g., as described above with reference to FIG. 7) to reduce the positive implement angle error down to zero. In this regard, as long as the implement angle error is still positive (e.g., as determined via steps (216) through (222)), the computing system 102 will continue to execute closed-loop position control.

However, as shown in FIG. 5, if it is determined, instead, at (222) that a negative implement angle error exists, then the computing system 102 is configured to compare the magnitude of such negative implement angle error to a predetermined dump error tolerance set for the implement 48. For example, as indicated above with reference to FIG. 3, a dump error tolerance 166 may defined for the implement 48 to provide a buffer or margin in the dumping direction 53 across which an acceptable error relative to the target implement angle 160 may be accommodated without transitioning to closed-loop control. Thus, as shown in FIG. 5, the computing system 102 may, at (226) be configured to determine whether the negative implement angle error is less than the predetermined dump error tolerance. If the negative implement angle error is less than the predetermined dump error tolerance, the computing system 102 may, at (220), simply execute feed-forward control (e.g., in a manner similar to the sub-algorithm shown in FIG. 6) without requiring any closed-loop control. However, if it is instead determined that the negative implement angle error is greater than (or equal to) the predetermined dump error tolerance, the computing system 102 may, at (228), be configured to execute closed-loop velocity control to transition the implement angle back towards the target implement angle.

Figure 8:
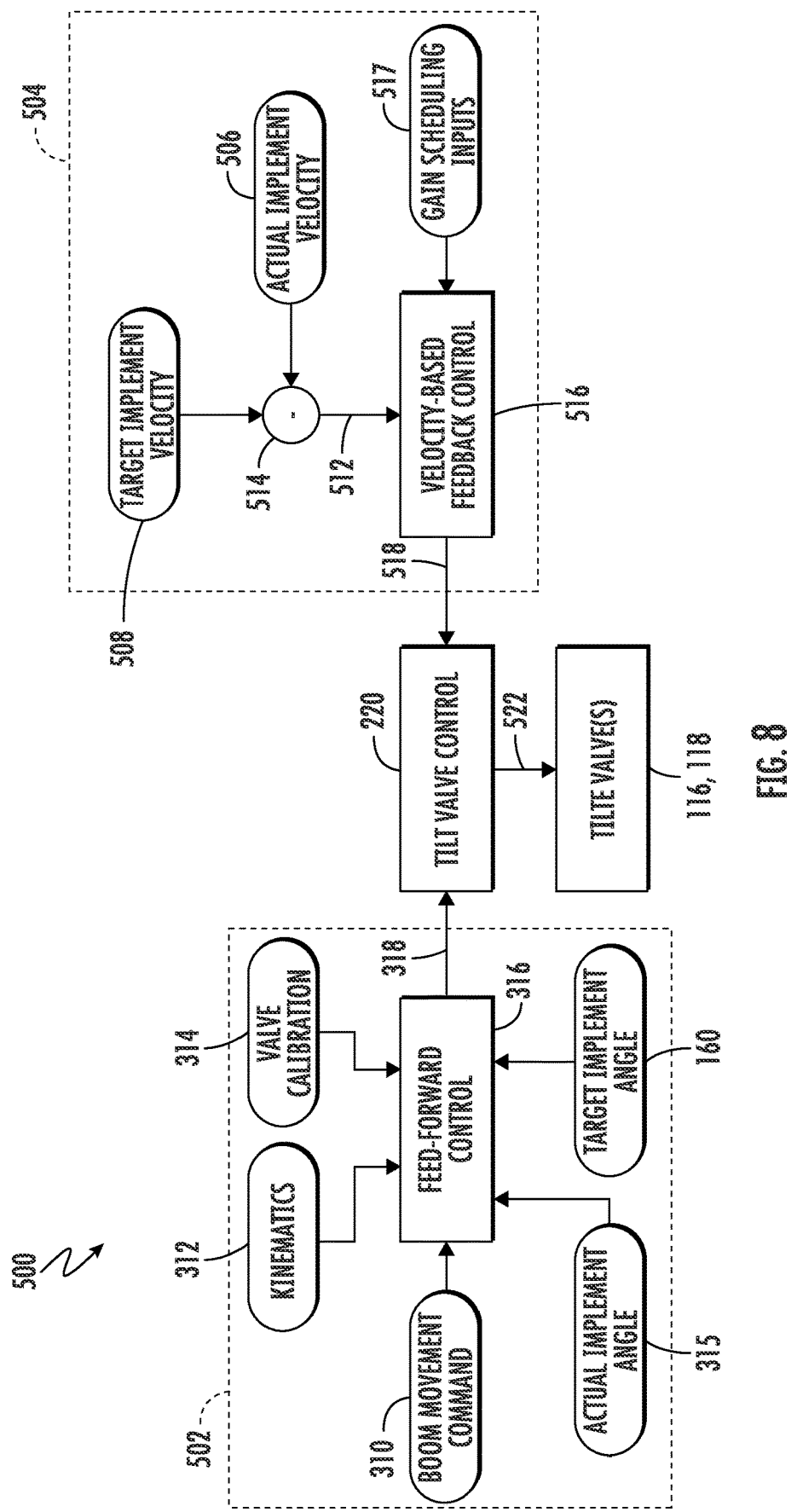
FIG. 8 illustrates a flow diagram of one embodiment of a closed-loop velocity control sub-algorithm that may be utilized when controlling angular orientation of the implement in accordance with aspects of the present subject matter.

An example of a suitable closed-loop velocity control sub-algorithm 500 that may be utilized at (228) to control the operation of the tilt valves 116, 188 is shown in FIG. 8. As shown in FIG. 8, in several embodiments, the closed-loop velocity control sub-algorithm 500 may employ both a feed-forward control portion (indicated by dashed box 502 in FIG. 8) and a feedback control portion (indicated by dashed box 504 in FIG. 8). Similar to that described above with reference to FIG. 7, the feed-forward control portion 502 of the disclosed algorithm 500 may be configured to receive one or more input signals, such as the target implement angle (e.g., box 160), the boom movement command (e.g., box 310), kinematics data (e.g., box 312), valve calibration data (e.g., box 314), the actual implement angle (e.g., box 315) and the like. The various input signals may then be input into a feed-forward block 316 in order to generate a feed-forward control signal 318. As indicated, the feed-forward control signal 318 may correspond to a speed control signal that, based on the input signals, is associated with a calculated rate of change or speed at which the implement 48 needs to be moved in order to maintain the implement 48 at the target implement angle 160 as the boom 42 is being moved.

Additionally, the feedback control 504 may be configured to determine the error between an actual velocity (e.g., box 506) and a target velocity (e.g., box 508) for the implement 48, which may then be used to adjust the calculated implement speed associated with the feed-forward control signal 318. In several embodiments, the implement velocity may refer to the implement velocity relative to the ground, in which case the target velocity 508 of the implement 48 will be zero since the control strategy is attempting to maintain the implement at a fixed angle (i.e., the target implement angle 160) relative to the ground. As shown in FIG. 8, a corresponding difference or error signal 512 between the actual and target implement velocity may be generated (e.g., via the difference block 514). The error signal 512 may then be input into a feedback function block 516 (along with any suitable gain scheduling inputs 517) to generate a feedback control signal 518 that may serve as an adjustment or correction factor for modifying the feed-forward control signal 318. For instance, the feedback control signal 518 may correspond to a speed correction factor that may be used to modify the implement speed associated with the feed-forward control signal 318.

It should be appreciated that, similar to the inputs described above with reference to FIG. 7, the additional gain scheduling inputs 517 that are input into the feedback function block 516 may correspond to numerous different inputs that may be taken into account when scheduling or calculating gains to be applied for closed-loop, velocity-based feedback control. For instance, in one embodiment, the gain scheduling inputs 517 may include inputs associated with the engine speed (e.g., in RPMs), the temperature of the hydraulic fluid contained within the hydraulic system, the pressure of the hydraulic fluid supplied within the various hydraulic cylinders, the velocity of the boom 42 and/or the implement 48 and/or the acceleration of the boom 42 and/or the implement 48. However, in other embodiments, the gain scheduling inputs 517 may correspond to any other input signal or combination of input signals.

As shown in FIG. 8, the output signals 318, 518 generated by the feed-forward and feedback control portions 502, 504 may then be input into a tilt valve control block 520 configured to generate a valve control command 522 for controlling the operation of the tilt valves 116, 118. Specifically, in several embodiments, the calculated implement speed associated with the feed-forward output signal 318 may be adjusted based on the calculated speed correction factor associated with the feedback output signal 518 so as to produce a final adjusted speed for the implement 48. Thereafter, the adjusted speed value may be converted into a suitable valve control command 522 that may be transmitted to the tilt valves 116, 118 in order to control the operation of the valve(s) 116, 118 in a manner that causes the implement 48 to be shifted back towards the target implement angle 160 as the boom 42 is being moved.

It should be appreciated that, similar to that described above with reference to FIG. 7, the feed-forward and feedback output signals 318, 518 may be combined or otherwise processed in any suitable manner in order to generate the final valve control command(s) 522. For instance, in one embodiment, one of the signals may be used as a multiplier or modifier to adjust the other signal. In another embodiment, the feed-forward and feedback output signals 318, 518 may simply be summed to generate the final valve control command(s) 522.

As indicated above, in several embodiments, the velocity-based control may be ramped-up across a given angular range (e.g., ramp-up range 169 shown in FIG. 4). In such embodiments, the feedback control signal 518 output from block 516 may correspond to the product of the initial feedback control signal calculated by block 516 and the relevant correction factor (e.g., a number ranging from zero (0) to one (1)). For instance, an initial feedback control signal may be calculated at block 516 based on the error signal 512 and the gain scheduling inputs 517, which can then be multiplied by the correction factor to allow for the velocity-based control to be ramped-up across the associated ramp-up range 169.

Referring back to FIG. 5, regardless of whether computing system 102 is executing feed-forward control (e.g., at (220), closed-loop position control (e.g., at (224), or closed-loop velocity control (e.g., at (228), the computing system 102 may, at (216), be configured to monitor the implement angle 150 relative to the target implement angle 160 to determine whether implement angle errors exists as the boom 42 is being moved so that the appropriate control strategy/algorithm may be selected for execution by the system 102. Such monitoring may continue until the boom 42 is no longer being moved.

Figure 9:
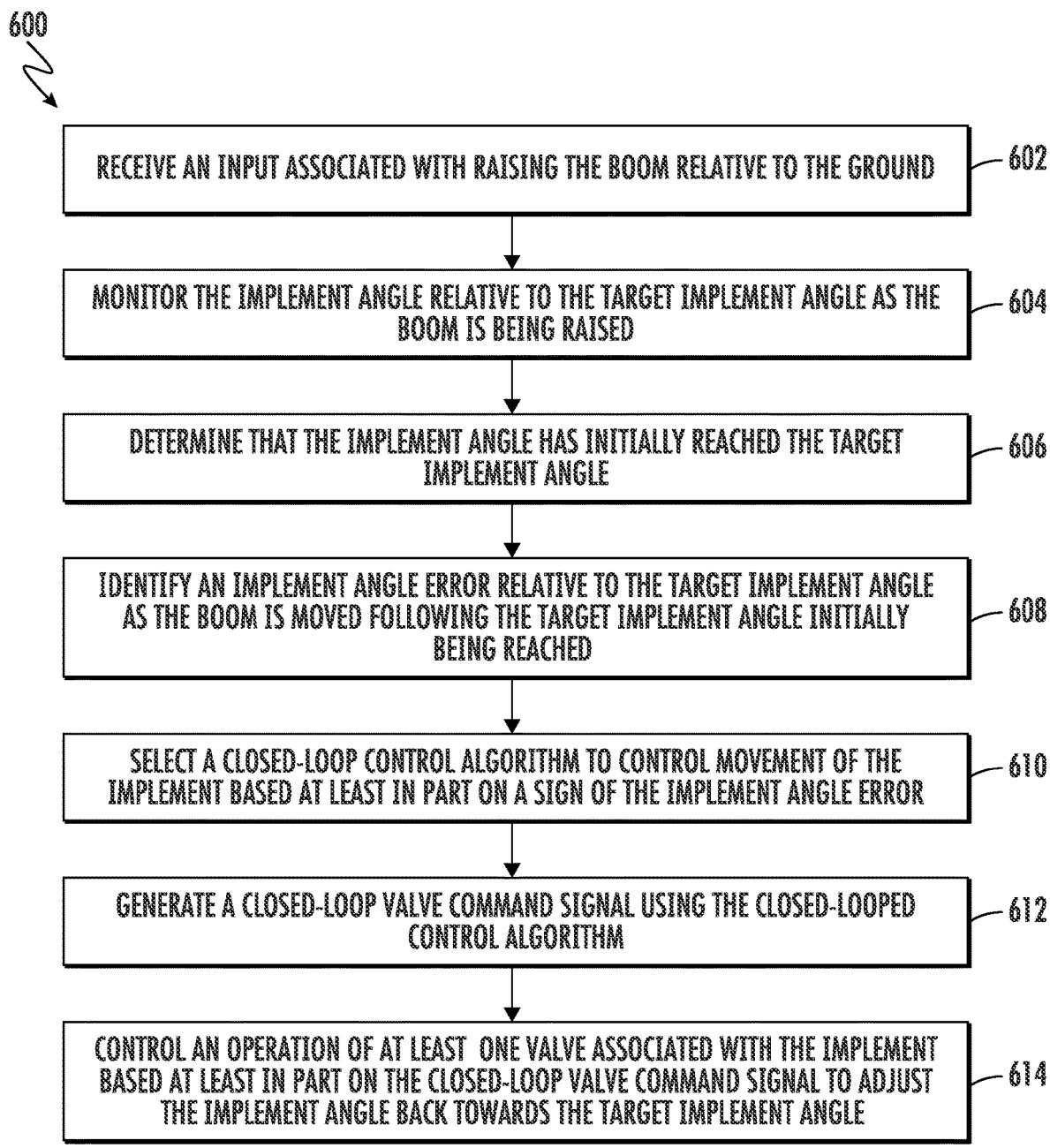
FIG. 9 illustrates a flow diagram of one embodiment of a method for automatically adjusting the position of an implement of a lift assembly of a work vehicle in accordance with aspects of the present subject matter.

Referring now to FIG. 9, a flow diagram of one embodiment of a method 600 for automatically adjusting the position of an implement of a lift assembly of a work vehicle is illustrated in accordance with aspects of the present subject matter. In general, the method 900 will be described herein with reference to the work vehicle 10, the system 100, and the various control algorithms/logic described above with reference to FIGS. 1-8. However, it should be appreciated by those of ordinary skill in the art that the disclosed method 600 may generally be implemented with any work vehicle having any suitable vehicle configuration and/or within any system having any suitable system configuration, as well as in association with any other suitable control algorithms/logic. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (602), the method 600 includes receiving an input associated with raising the boom relative to the ground. As indicated above, the input may be received by the operator, such as when the operator commands (via an input device 130) that the boom 42 be raised relative to the ground from a lowered position (e.g., position B1 of FIG. 3) to a raised position (e.g., position B3 of FIG. 3). Additionally, as indicated above, the implement 48 may initially oriented at an implement angle 150 that is less than the target implement angle 160 when the boom movement is initiated, such as an angle that is less than the dump transition angle 156.

Additionally, at (604), the method 600 incudes monitoring the implement angle relative to the target implement angle as the boom is being raised. Specifically, as indicated above, the computing system 102 may be configured to monitor the implement 150 relative to the target implement angle 160 (e.g., via input from position sensors 132) as the boom 42 is being raised.

Moreover, at (606) and (608), the method 600 includes determining that the implement angle has initially reached the target implement angle and then identifying an implement angle error relative to the target implement angle as the boom is moved following the target implement angle initially being reached. Specifically, as part of its implement angle monitoring, the computing system 102 may be configured to identify when the implement angle 150 initially reaches the target implement angle 160. Thereafter, the computing system 102 may be configured to continue monitoring the implement angle 150 relative to the target implement angle 160 as the boom 42 is moved further to identify the existence of implement angle errors (i.e., when the current implement angle 150 differs from the target implement angle 160).

Referring still to FIG. 9, at (610), the method 600 includes selecting a closed-loop control algorithm to control movement of the implement based at least in part on a sign of the implement angle error. Specifically, as indicated above, the computing system 102 may be configured to select or identify which closed-loop control strategy to execute based at least in part on the sign of the implement angle error (i.e., positive or negative). For example, if the implement angle error is a positive implement angle error, the computing system 102 is configured to execute closed-loop position control (e.g., by using the algorithm described above with reference to FIG. 7). In contrast, if the implement angle error is a negative implement angle error, the computing system 102 is configured to execute closed-loop velocity control (e.g., by using the algorithm described above with reference to FIG. 8). As indicated above, when the implement angle error is a negative implement angle error, the computing system 102 may also be configured to take into account the magnitude of the error, such as by comparing it to a predetermined dump error tolerance. In such instance, the computing system 102 may only be configured to execute closed-loop velocity control when: (1) the implement angle error is a negative implement angle error; and (2) the negative implement angle error exceeds (or is equal to) the dump error tolerance. If the negative implement angle error is less than the dump error tolerance, the computing system 102 may be configured to simply execute a feed-forward control strategy.

Additionally, at (612) and (614), the method 600 may include generating a closed-loop valve command signal using the closed-loop control algorithm and subsequently controlling an operation of at least one valve associated with the implement based at least in part on the closed-loop valve command signal to adjust the implement angle back towards the target implement angle. Specifically, as indicated above, when implement closed-loop control, the computing system 102 may be configured to generate a valve command signal for controlling the operation of the tilt valves 116, 118. The valve command signal may then be transmitted to the tilt valves 116, 118 to ensure that the tilt cylinders 52 are actuated as desired to adjust the implement angle 150 back towards the target implement angle 160.

It is to be understood that the steps of the disclosed control logic, algorithms, and/or methods are performed by the computing system 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 102 described herein, such as the control logic, algorithms, and/or methods, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the control logic, algorithms, and/or methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for automatically adjusting the position of an implement of a lift assembly of a work vehicle, the lift assembly comprising a boom coupled to the implement, the method comprising:
 receiving, with a computing system, an input associated with raising the boom relative to the ground, the implement being initially oriented at an implement angle that differs from a target implement angle;
 monitoring, with the computing system, the implement angle relative to the target implement angle as the boom is being raised;
 determining, with the computing system, that the implement angle has initially reached the target implement angle;
 identifying, with the computing system, an implement angle error relative to the target implement angle as the boom is moved following the target implement angle initially being reached;
 selecting, with the computing system, a closed-loop control algorithm to control movement of the implement based at least in part on a sign of the implement angle error, the closed-loop control algorithm corresponding to a closed-loop position control algorithm when the implement angle error is a positive implement angle error and a closed-loop velocity control algorithm when the implement angle error is a negative implement angle error;

generating, with the computing system, a closed-loop valve command signal using the closed-loop control algorithm; and controlling, with computing system, an operation of at least one valve associated with the implement based at least in part on the closed-loop valve command signal to adjust the implement angle back towards the target implement angle.

2. The method of claim 1, further comprising monitoring the implement angle relative to a dump transition angle as the boom is being raised, the dump transition angle being less than the target implement angle.

3. The method of claim 2, further comprising:
determining that the implement angle is less than the dump transition angle as the boom is being raised;
continuing to raise the boom without active control of the at least one valve to allow the implement angle to increase towards the dump transition angle due to natural rollback of the implement.

4. The method of claim 2, further comprising:
determining that the implement angle is greater than the dump transition angle and less than the target implement angle as the boom is being raised;
determining a feed-forward control signal associated with controlling movement of the implement based at least in part on a boom movement command for the boom;
generating a feed-forward valve command signal based at least in part on the feed-forward control signal; and
controlling the operation of the at least one valve based at least in part on the feed-forward valve command signal when the implement angle is greater than the dump transition angle and less than the target implement angle to increase the implement angle towards the target implement angle as the boom is being raised.

5. The method of claim 1, wherein selecting the closed-loop control algorithm comprises selecting the closed-loop position control algorithm for controlling movement of the implement when the implement angle error corresponds to the positive implement angle error.

6. The method of claim 5, wherein determining the closed-loop valve command signal comprises:
determining a feed-forward control signal associated with controlling movement of the implement based at least in part on a boom movement command for the boom;
determining a feedback control signal associated with controlling movement of the implement based at least in part on the positive implement angle error; and
determining the closed-loop valve command signal based at least in part on the feed-forward control signal and the feedback control signal.

7. The method of claim 1, wherein selecting the closed-loop control algorithm comprises selecting the closed-loop velocity control algorithm for controlling movement of the implement when the implement angle error corresponds to the negative implement angle error.

8. The method of claim 7, wherein determining the closed-loop valve command signal comprises:
determining a feed-forward control signal associated with controlling movement of the implement based at least in part on a boom movement command for the boom;
determining a feedback control signal associated with controlling movement of the implement based at least in part on a velocity error between an actual velocity of the implement and a target velocity of the implement; and determining the closed-loop valve command signal based at least in part on the feed-forward control signal and the feedback control signal.

9. The method of claim 1, further comprising comparing the negative implement angle error to a dump error tolerance for the implement; and
wherein selecting the closed-loop control algorithm comprises selecting the closed-loop velocity control algorithm for controlling movement of the implement when the negative implement angle error exceeds the dump tolerance error.

10. The method of claim 9, wherein closed-loop velocity control using the closed-loop velocity control algorithm is ramped-up across a ramp-up angular range when the negative implement angle error exceeds the dump tolerance error.

11. The method of claim 9, further comprising:
determining a feed-forward control signal associated with controlling movement of the implement based at least in part on a boom movement command for the boom when the negative implement angle error is less than the dump tolerance error;
generating a feed-forward valve command signal based at least in part on the feed-forward control signal; and
controlling the operation of the at least one valve based at least in part on the feed-forward valve command signal when the negative implement angle error is less than the dump tolerance error to reduce the negative implement angle error.

12. The method of claim 1, wherein the positive implement angle error exists when the implement has shifted away from the target implement angle in a rollback direction and the negative implement angle error exists when the implement has shifted away from the target implement angle in a dump direction.

13. A method for automatically adjusting the position of an implement of a lift assembly of a work vehicle, the lift assembly comprising a boom coupled to the implement, the method comprising:
receiving, with a computing system, an input associated with raising the boom relative to the ground, the implement being initially oriented at an implement angle that differs from a target implement angle;
monitoring, with the computing system, the implement angle relative to the target implement angle as the boom is being raised;
determining, with the computing system, that the implement angle has initially reached the target implement angle;
identifying, with the computing system, an implement angle error relative to the target implement angle as the boom is moved following the target implement angle initially being reached;
executing, with the computing system, closed-loop position control to control movement of the implement when the implement angle error is a positive implement angle error, wherein execution of the closed-loop position control comprises:
generating, with the computing system, a first closed-loop valve command signal based at least in part on the positive implement angle error; and
controlling, with computing system, an operation of at least one valve associated with the implement based at least in part on the first closed-loop valve command signal to adjust the implement angle back towards the target implement angle; and executing, with the computing system, closed-loop velocity control to control movement of the implement when the implement angle error is a negative implement angle error, wherein execution of the closed-loop velocity control comprises:

generating, with the computing system, a second closed-loop valve command signal based at least in part on a velocity error associated with the implement; and controlling, with computing system, the operation of the at least one valve based at least in part on the second closed-loop valve command signal to adjust the implement angle back towards the target implement angle.

14. A system for controlling the operation of a work vehicle, the system comprising:

a lift assembly including a boom and an implement coupled to the boom;

at least one tilt valve in fluid communication with a corresponding tilt cylinder, the at least one tilt valve being configured to control a supply of hydraulic fluid to the tilt cylinder to adjust a position of the implement relative to the boom;

a computing system communicatively coupled to the at least one tilt valve, the computing system being configured to:

receive an input associated with raising the boom relative to the ground, the implement being initially oriented at an implement angle that differs from a target implement angle;

monitor the implement angle relative to the target implement angle as the boom is being raised;

determine that the implement angle has initially reached the target implement angle;

identify an implement angle error relative to the target implement angle as the boom is moved following the target implement angle initially being reached;

select a closed-loop control algorithm to control movement of the implement based at least in part on a sign of the implement angle error, the closed-loop control algorithm corresponding to a closed-loop position control algorithm when the implement angle error is a positive implement angle error and a closed-loop velocity control algorithm when the implement angle error is a negative implement angle error;

generate a closed-loop valve command signal using the closed-loop control algorithm; and control an operation of the at least one tilt valve based at least in part on the closed-loop valve command signal to adjust the implement angle back towards the target implement angle.

15. The system of claim 14, wherein the computing system is further configured to monitor the implement angle relative to a dump transition angle as the boom is being raised, the dump transition angle being less than the target implement angle;

wherein, when the implement angle is less than the dump transition angle as the boom is being raised, the computing system is configured to continue to raise the boom without active control of the at least one tilt valve to allow the implement angle to increase towards the dump transition angle due to natural rollback of the implement; and wherein, when the implement angle is greater than the dump transition angle and less than the target implement angle as the boom is being raised, the computing system is configured to:

determine a feed-forward control signal associated with controlling movement of the implement based at least in part on a boom movement command for the boom;

generate a feed-forward valve command signal based at least in part on the feed-forward control signal; and control the operation of the at least one tilt valve based at least in part on the feed-forward valve command signal when the implement angle is greater than the dump transition angle and less than the target implement angle to increase the implement angle towards the target implement angle as the boom is being raised.

16. The system of claim 14, wherein the computing system is configured to select the closed-loop position control algorithm for controlling movement of the implement when the implement angle error corresponds to the positive implement angle error.

17. The system of claim 16, wherein the computing system is configured to determine the closed-loop valve command signal by:

determining a feed-forward control signal associated with controlling movement of the implement based at least in part on a boom movement command for the boom;

determining a feedback control signal associated with controlling movement of the implement based at least in part on the positive implement angle error; and determining the closed-loop valve command signal based at least in part on the feed-forward control signal and the feedback control signal.

18. The system of claim 14, wherein the computing system is configured to select the closed-loop velocity control algorithm for controlling movement of the implement when the implement angle error corresponds to the negative implement angle error.

19. The system of claim 18, wherein the computing system is configured to determine the closed-loop valve command signal by:

determining a feed-forward control signal associated with controlling movement of the implement based at least in part on a boom movement command for the boom;

determining a feedback control signal associated with controlling movement of the implement based at least in part on a velocity error between an actual velocity of the implement and a target velocity of the implement; and determining the closed-loop valve command signal based at least in part on the feed-forward control signal and the feedback control signal.

20. The system of claim 14, wherein the computing system is further configured to compare the negative implement angle error to a dump error tolerance for the implement, the computing system being configured to select the closed-loop velocity control algorithm for controlling movement of the implement when the negative implement angle error exceeds the dump tolerance error.

* * * * *